(12) United States Patent
Chidlovskii

(10) Patent No.: US 10,430,736 B2
(45) Date of Patent: Oct. 1, 2019

(54) SYSTEM AND METHOD FOR ESTIMATING A DYNAMIC ORIGIN-DESTINATION MATRIX

(75) Inventor: Boris Chidlovskii, Meylan (FR)

(73) Assignee: CONDUENT BUSINESS SERVICES, LLC, Dallas, TX (US)

( * ) Notice: Subject to any disclaimer, the term of this patent is extended or adjusted under 35 U.S.C. 154(b) by 455 days.

(21) Appl. No.: 13/480,802

(22) Filed: May 25, 2012

(65) Prior Publication Data

US 2013/0317884 A1 Nov. 28, 2013

(51) Int. Cl.
| | |
|---|---|
| G06Q 10/00 | (2012.01) |
| G06Q 10/06 | (2012.01) |
| G06Q 50/30 | (2012.01) |
| G06Q 10/02 | (2012.01) |
| G06Q 10/04 | (2012.01) |

(52) U.S. Cl.
CPC ......... *G06Q 10/063* (2013.01); *G06Q 10/025* (2013.01); *G06Q 10/047* (2013.01); *G06Q 50/30* (2013.01)

(58) Field of Classification Search
CPC ...... G06Q 10/06; G06Q 10/04; G06Q 10/047; G06Q 10/025; G06Q 10/06315; G06Q 10/063
USPC .............................................. 705/7.11–7.42
See application file for complete search history.

(56) References Cited

U.S. PATENT DOCUMENTS

| | | | | |
|---|---|---|---|---|
| 5,272,638 A | * | 12/1993 | Martin ............... | G01C 21/3446 340/990 |
| 5,608,635 A | * | 3/1997 | Tamai ................ | G01C 21/3461 340/990 |

(Continued)

FOREIGN PATENT DOCUMENTS

| | | |
|---|---|---|
| DE | 101 63 127 A1 | 7/2003 |
| DE | 10 2004 063 600 A1 | 7/2006 |
| WO | WO 01/69540 A1 | 9/2001 |

OTHER PUBLICATIONS

Cui, Alex. Bus Passenger Origin-Destination Matrix Estimation Using Automated Data Collection Systems. Massachusetts Institute of Technology, 2006 (Year: 2006).*
European Search Report for Application No. EP 13 16 8158; Date of completion of the search: Jul. 22, 2013; Place of search: The Hague.
U.S. Appl. No. 13/481,042, filed May 25, 2012, entitled, "System and Method for Estimating Origins and Destinations From Identified End-Point Time-Location Stamps," by Ulloa Paredes et al.
U.S. Appl. No. 13/480,612, filed May 25, 2012, entitled, "System and Method for Trip Plan Crowdsourcing Using Automatic Fare Collection Data," by Boris Chidlovskii et al.

(Continued)

*Primary Examiner* — William S Brockington, III
(74) *Attorney, Agent, or Firm* — Fay Sharpe LLP

(57) ABSTRACT

A method and system are disclosed for dynamically estimating an origin-destination matrix. An origin-destination matrix is initialized with a set of origin stops and destination stops. Validation sequences are acquired for a set of travelers on a transportation system which include a plurality of the origin stops and respective timestamps. Corresponding destination stops may be known or inferred. For each validation sequence, a set of subsequences is generated, each including a respective one of the origin stops and the associated timestamp. Subsequences which, in combination, constitute a valid transfer trip are identified. For a combination of subsequences constituting a valid transfer trip, the method includes determining whether the valid transfer trip is a multi-goal trip for which there is least a first destination stop with an intermediate goal and a second destination stop with a final goal. The origin-destination matrix is updated, based on the determination.

21 Claims, 17 Drawing Sheets

(56) References Cited

U.S. PATENT DOCUMENTS

| | | | | |
|---|---|---|---|---|
| 5,675,492 A * | 10/1997 | Tsuyuki | ............ | G01C 21/3407 340/988 |
| 6,005,494 A * | 12/1999 | Schramm | ............ | G01C 21/3469 340/988 |
| 6,304,856 B1 * | 10/2001 | Soga | ............ | G06Q 10/063 705/28 |
| 6,804,658 B2 * | 10/2004 | Lim | ............ | G06Q 10/02 705/6 |
| 6,826,472 B1 * | 11/2004 | Kamei | ............ | G01C 21/3605 340/995.19 |
| 8,024,112 B2 * | 9/2011 | Krumm | ............ | G01C 21/3617 340/990 |
| 8,255,250 B2 * | 8/2012 | Parker | ............ | G06Q 10/02 705/7.11 |
| 8,504,404 B2 * | 8/2013 | Norton | ............ | G01C 21/3407 705/7.19 |
| 8,560,361 B2 * | 10/2013 | Shang | ............ | G06Q 30/0202 705/7.11 |
| 8,612,273 B2 * | 12/2013 | Johnson | ............ | G06Q 10/02 705/307 |
| 8,688,599 B2 * | 4/2014 | Yoshizumi | ............ | G06Q 10/08 705/330 |
| 8,731,984 B2 * | 5/2014 | Rodriguez | ............ | G06Q 10/025 705/318 |
| 8,930,135 B2 * | 1/2015 | Abramovich Ettinger | ............ | G01C 21/3476 340/995.19 |
| 2003/0040944 A1 * | 2/2003 | Hileman | ............ | G06Q 10/02 705/5 |
| 2003/0078802 A1 * | 4/2003 | Yonezawa | ............ | G06Q 10/047 705/338 |
| 2003/0158771 A1 * | 8/2003 | Shen | ............ | G06Q 10/06375 705/7.33 |
| 2004/0158483 A1 * | 8/2004 | Lecouturier | ............ | G06Q 10/08 705/6 |
| 2005/0228553 A1 * | 10/2005 | Tryon | ............ | B60K 6/46 701/22 |
| 2005/0246192 A1 * | 11/2005 | Jauffred | ............ | G06Q 10/047 705/338 |
| 2006/0106768 A1 * | 5/2006 | van Deursen | ............ | G06Q 10/02 |
| 2007/0162372 A1 * | 7/2007 | Anas | ............ | G06Q 10/04 705/35 |
| 2008/0027772 A1 * | 1/2008 | Gernega | ............ | G06Q 10/04 705/7.26 |
| 2008/0306795 A1 * | 12/2008 | Ho | ............ | G06Q 10/047 705/7.26 |
| 2009/0075673 A1 * | 3/2009 | Kim | ............ | G01C 21/343 455/456.1 |
| 2009/0234682 A1 * | 9/2009 | Baggett | ............ | G06Q 10/02 705/6 |
| 2010/0036602 A1 * | 2/2010 | Lee | ............ | G01C 21/3415 701/533 |
| 2010/0185486 A1 * | 7/2010 | Barker | ............ | G06Q 30/0202 705/7.31 |
| 2010/0220632 A1 * | 9/2010 | Javaid | ............ | H04L 45/302 370/255 |
| 2011/0029182 A1 * | 2/2011 | Hyde | ............ | G06Q 30/02 701/31.4 |
| 2011/0093192 A1 * | 4/2011 | Yang | ............ | G01C 21/362 701/408 |
| 2011/0173099 A1 * | 7/2011 | Jantsch | ............ | G06Q 30/06 705/27.1 |
| 2012/0101698 A1 * | 4/2012 | Eriksson | ............ | B60W 30/143 701/53 |
| 2012/0303275 A1 * | 11/2012 | Neugebauer | ............ | G01C 21/3614 701/533 |
| 2013/0035089 A1 * | 2/2013 | Moritz | ............ | H04W 64/00 455/422.1 |

OTHER PUBLICATIONS

U.S. Appl. No. 13/351,560, filed Jan. 17, 2012, entitled, "Location-Type Tagging Using Collected Traveler Data," by Guillaume M. Bouchard et al.

Neal Lathia et al., "Mining Public Transport Usage for Personalised Intelligent Transport Systems," ICDM, pp. 887-892, 2010.

Torgil Abrahamsson, "Estimation of Origin-Destination Matrices Using Traffic Counts—A Literature Survey," International Institute for Applied Systems Analysis, Interim Report, IR-98-021/May, Austria.

Hai Yang et al., "Estimation of Origin-Destination Matrices from Link Traffic Counts on Congested Networks," Transpn. Res.-B, vol. 26B, No. 6, pp. 417-434, 1992. Printed in Great Britain.

Alex Cui, "Bus Passenger Origin-Destination Matrix Estimation Using Automated Data Collection Systems," in MIT, Dept. of Civil and Environmental Engineering, MS thesis, 2006.

Michael Keane et al., "Generalized Indirect Inference for Discrete Choice Models," preliminary and incomplete working paper, Department of Economics at Yale University, Nov. 2003.

Kenneth E. Train, "Discrete Choice Methods with Simulation," Sections 2, 3 and 6, Cambridge University Press, Second Edition, 2009.

Markus Hofmann et al., "Transfer Journey Identification and Analyses from Electronic Fare Collection Data," pp. 825-830, in Proceedings of the 8th International IEEE Conference on Intelligent Transportation Systems, Vienna, Austria, Sep. 13-16, 2005.

\* cited by examiner

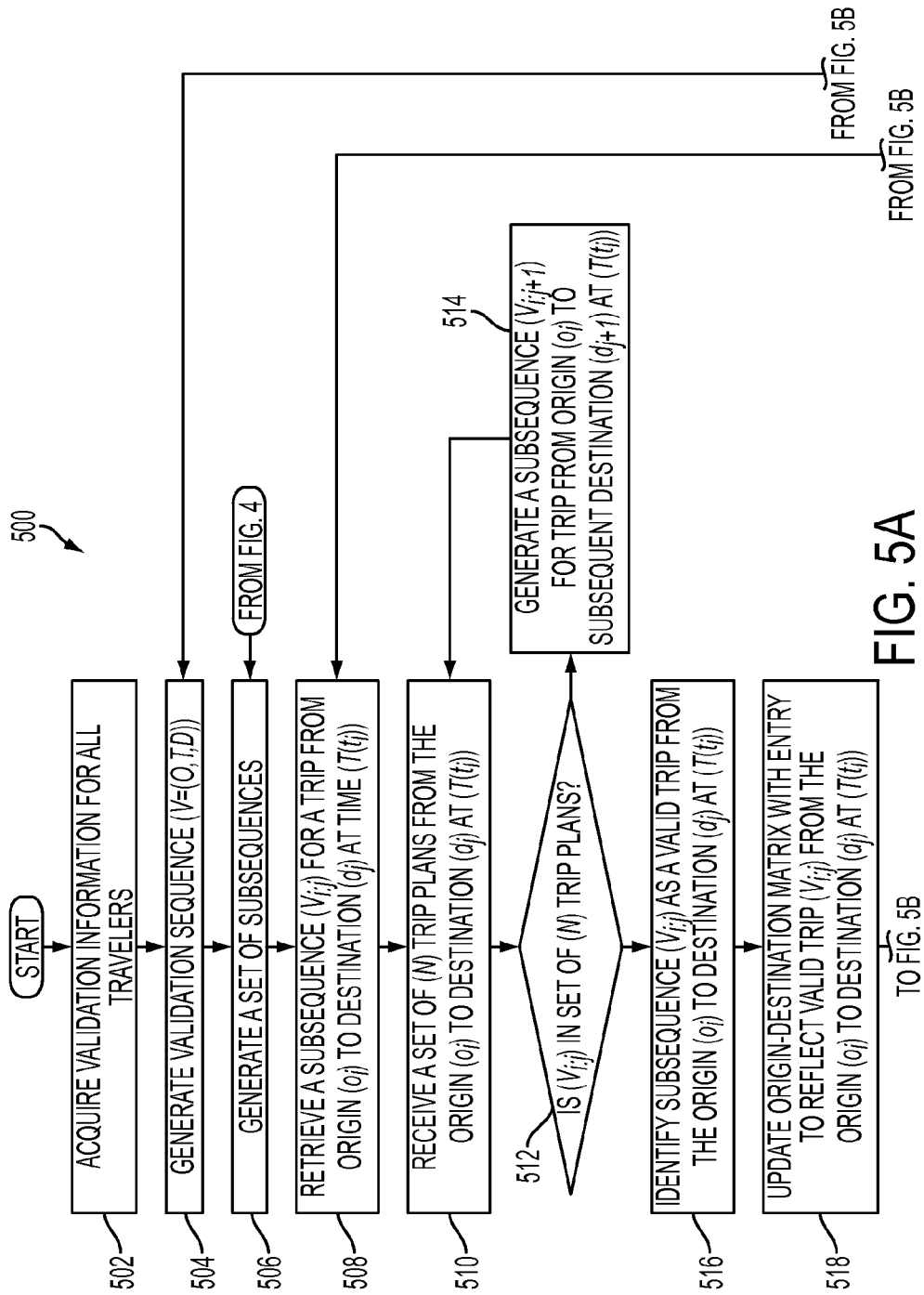

SYSTEM AND METHOD FOR ESTIMATING A DYNAMIC ORIGIN-DESTINATION MATRIX

BACKGROUND

The following relates to the transportation arts, data processing arts, data analysis, tracking arts, and so forth.

Intelligent transportation systems generally include multiple vehicles, routes, and services that are utilized by a large number of users, which may include automatic ticketing validation systems that collect validation information for travelers. To aid management and planning of transportation systems it is desirable to be able to identify the origins and destinations of travelers. By identifying these end points, administrators are able to build and maintain more efficient transportation systems, such as by adding additional routes between frequently visited origins and destinations, increasing the number of buses or trains on a route, increasing the size of facilities (bus stops, train stations, etc.), and the like.

Transportation forecasting is a process of estimating a number of vehicles or people that will use a specific transportation facility in the future, e.g., a number of vehicles on a planned road or bridge, a number of passengers on a train, a number of passengers visiting an airport, a number of ships docking at a seaport, and the like. Transportation forecasting first begins with the collection of data on the current conditions or traffic at the facility (or a similar facility). This data is combined with other known information, e.g., population, employment, trip rates, costs, etc., which are then used to develop a traffic demand model for the current conditions, which may then be solved with predicted data to estimate future traffic conditions, e.g., amount of passengers on public transportation, number of vehicles on a bridge, etc. A typical transportation forecasting model includes trip generation, trip distribution, mode choice, and route assignment information.

Such estimated traffic forecasts may be used for transportation policy making, planning, engineering, and the like. For example, they may be used to determine a number of railway trains that should be available on a given route, a number of lanes on a proposed bridge, to estimate financial and social costs associated with a particular projection, to estimate possible environmental impacts, and the like.

Of particular use in transportation forecasting is the generation of origin-destination matrices during the trip distribution component. These matrices contain information about the spatial and temporal distribution of activities between different traffic zones in the network. Each cell of the matrix represents the number of passengers traveling between an origin and a destination in the study area. Origin-destination matrices are used to estimate the demand for transportation systems; then, based on anticipated future economic and population growth, land-use changes, and planning policies, these matrices are projected to identify and forecast future demand.

Real-time information collected by an automatic ticketing validation system may capture the traffic dynamics, and the dynamic traffic assignment may incorporate time dimension in the simulation of traffic flow. The time-dependent origin-destination is therefore one of the essential components of intelligent transportation system. However, previous attempts to generate these matrices from the real-time information have met with limited success. When assigned to the transportation system, these previous matrices failed to reproduce the observed traffic flows.

In particular, these previous attempts fail to identify and account for multi-goal trips of travelers on the transportation system. That is, in agglomeration areas with a dense public transportation network, travelers plan their trips with multiple goals in mind. Most typical examples are when travelers break or deviate from their trips on the way from home to the office or back. On their way to the office, a passenger may wish to accompany her kids to the school; on the way home, she may stop at a shopping mall, etc. Targeting multiple goals when using public transportation appears to be common for certain categories of travelers. The previous attempts at origin-destination matrix generation fail to account for these multiple goals, which negatively impacts the evaluation of any origin-destination matrix associated with the underlying transportation system. However, the identification of a transfer trip that targets one or multiple goals is a challenge.

Thus, it would be advantageous to provide a system and method capable of identifying multi-goal trips and appropriately incorporate these trips into a dynamic origin-destination matrix for a transportation system.

INCORPORATION BY REFERENCE

The following references, the disclosures of which are incorporated herein by reference, in their entirety, are mentioned.

U.S. patent application Ser. No. 13/351,560, filed Jan. 17, 2012, entitled LOCATION-TYPE TAGGING USING COLLECTED TRAVELER DATA, by Guillaume M. Bouchard, et al.

U.S. patent application Ser. No. 13/480,612, filed May 25, 2012, entitled SYSTEM AND METHOD FOR TRIP PLAN CROWDSOURCING USING AUTOMATIC FARE COLLECTION DATA, by Boris Chidlovskii and Luis Rafael Ulloa Paredes.

U.S. patent application Ser. No. 13/481,042, filed May 25, 2012, entitled SYSTEM AND METHOD FOR ESTIMATING ORIGINS AND DESTINATIONS FROM IDENTIFIED END-POINT TIME-LOCATION STAMPS, by Luis Rafael Ulloa Paredes and Guillaume M. Bouchard.

BRIEF DESCRIPTION

In one aspect of the exemplary embodiment, a method for dynamically updating an origin-destination matrix for a transportation system includes acquiring validation sequences for at least some of a plurality of travelers on the transportation system, at least some of the validation sequences including a set of origin stops, a set of known or inferred destination stops, and associated timestamps corresponding thereto. The method also includes generating a set of subsequences for each of the validation sequences, each subsequence including an origin stop, at least one destination stop, and a time segment corresponding to a boarding at the origin stop of a traveler, identifying subsequences in the set which constitute a valid transfer trip, and providing for identifying at least one multi-goal trip in the identified at least one subsequence in accordance with an intermediate destination stop in the at least one subsequence. In addition, the method includes updating the origin-destination matrix in accordance with each of the identified subsequences and/or multi-goal trips.

In another aspect, an origin-destination matrix generation system includes a validation sequence generator configured for defining a validation sequence for at least some of a plurality of travelers on a transportation system at least some of the validation sequences including a set of origin stops, a set of inferred destination stops, and associated timestamps corresponding thereto. The system also includes a subsequence generator configured for generating a set of subsequences for each of the validation sequences, each subsequence including an origin stop, at least one destination stop, and a time segment corresponding to a boarding at the origin stop of a traveler. In addition, the system includes a trip planning component configured for determining a set of trip plans from the origin stop to the at least one destination stop at the time segment, and a processor in communication with memory. The memory includes instructions which are executed by the processor for identifying at least one subsequence in the set thereof as a valid transfer trip in accordance with the at least one subsequence present in the set of trip plans, identifying at least one multi-goal trip in the identified at least one subsequence in accordance with an intermediate destination stop in the at least one subsequence, and updating the origin-destination matrix in accordance with each of the identified subsequences and multi-goal trips.

In another aspect, a computer-implemented method for dynamically generating an origin-destination matrix of a transportation system. The method includes acquiring validation information for each of a plurality of travelers of the transportation system, the validation information including at least one origin stop, and at least one timestamp. The method also includes selecting, with a processor, a set of possible alighting stops for each of the origin stop in the validation information, the set of possible alighting stops selected in accordance with at least one of a proximity to a subsequent origin stop, a route associated with the origin stop, and a schedule associated with a vehicle boarded at the origin stop. In addition, the method includes computing a probability for each of the set of possible alighting stops relative to the origin stop corresponding to the probability that each alighting stop is a destination stop of the origin stop, and selecting a possible alighting stop from the set thereof as the destination stop of the origin stop in accordance with the computed probability associated therewith for each of the set of origin stops. The method further includes generating validation sequences for at least some of the plurality of travelers in accordance with the acquired validation information and the selected destination stops for each of the set of origin stops, and segmenting each validation sequence into a set of subsequences, each subsequence including an origin stop, at least one inferred destination stop, and a time segment associated with the timestamp corresponding to the origin stop. Additionally, the method includes receiving a set of trip plans from the origin stop to the at least one destination stop at the time segment for each subsequence, and identifying at least one subsequence in the set thereof as a valid transfer trip in accordance with the at least one subsequence present in the set of trip plans. The method also includes identifying at least one multi-goal trip in the identified at least one subsequence in accordance with an intermediate destination stop in the at least one subsequence, and updating the origin-destination matrix in accordance with each of the identified subsequences and multi-goal trips.

BRIEF DESCRIPTION OF THE DRAWINGS

FIGS. 5A-5B is a flowchart which illustrates another part of the method of FIG. 3, in accordance with one aspect of the exemplary embodiment.

DETAILED DESCRIPTION

Figure 1A:
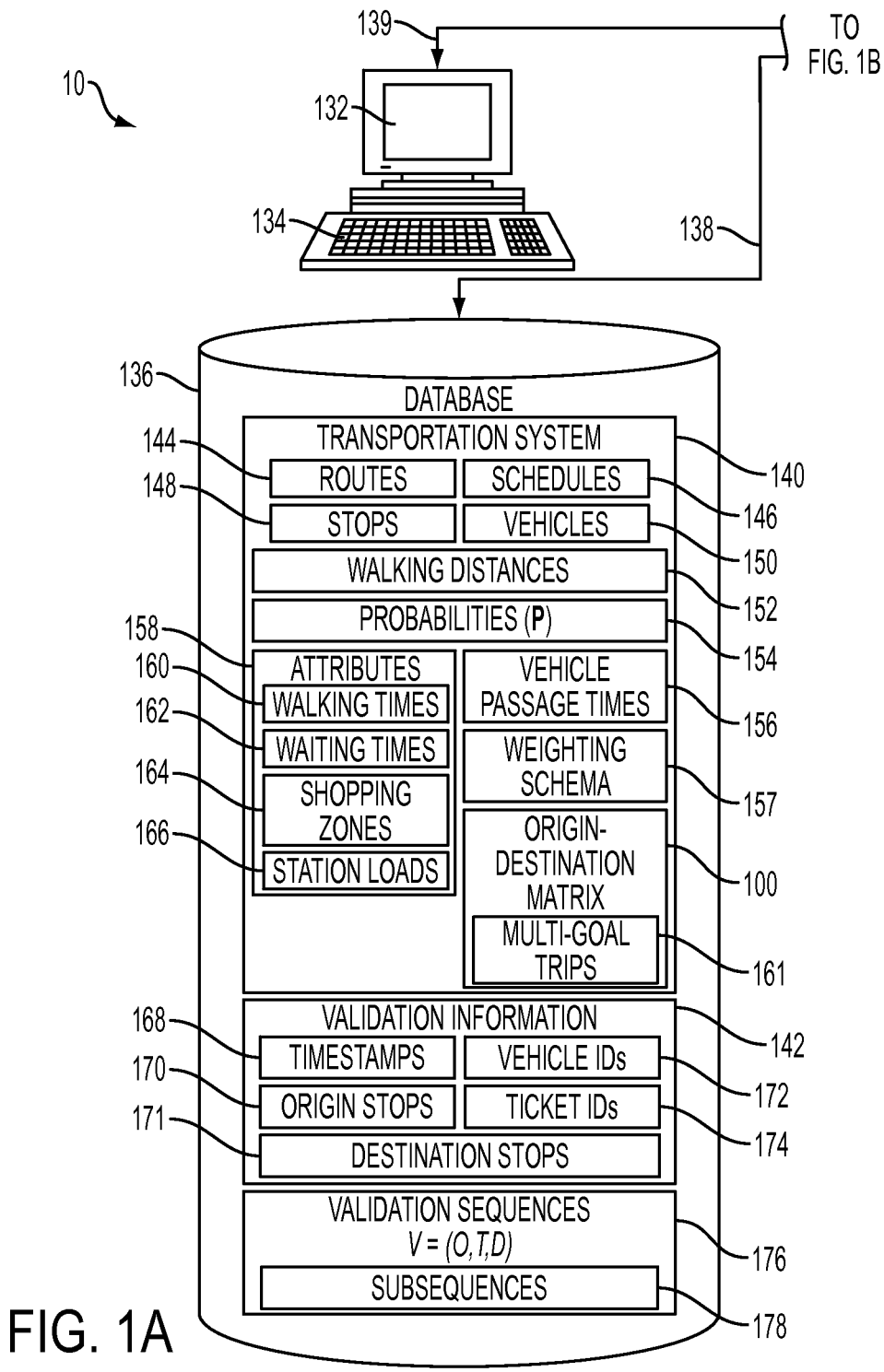
FIGS. 1A-1C is a functional block diagram of an origin and destination matrix estimating system for a transportation system in accordance with one aspect of the exemplary embodiment.

One or more embodiments will now be described with reference to the attached drawings, wherein like reference numerals are used to refer to like elements throughout.

In one aspect, a method is provided for dynamically estimating an origin-destination matrix for a transportation system using ticket validation information. Briefly, the method uses data acquired for travelers on the transportation system, which includes origin information and may or may not include destination information. Destination information may be inferred based upon a discrete choice model of traveler behavior in the event that only origin information is collected. This information may be then used to infer multi-goal trips, allowing these multi-goal trips to contribute information to the origin-destination matrix, enabling the identification and forecasting of demand on the transportation system.

A transportation system, such as a public transportation system, includes a transportation network that includes a predefined set of routes. The routes are each traveled by one or more transportation vehicles of the transportation system, such as public transport vehicles, according to predefined schedules. The transportation vehicles may be of the same type or different types (bus, train, tram, or the like). In one embodiment, the transportation vehicles include buses or trams. There may be five, ten or more routes on the transportation network. Each route has a plurality of predefined stops which are spaced in their locations and in most or all cases, a route has at least three, four, five or more stops. A traveler may select a first stop on one of the predefined routes from the set of available stops on the route as his origin stop and select a second stop on the same or a different route on the network as his destination stop. A traveler may make connections between routes before reaching the destination stop. The traveler purchases or is otherwise provided with a ticket which is valid between the origin and destination stops.

The travelers on the transportation system, in any given time period, may use a multiple destination ticket which allows a user to make two or more journeys, often at time periods spaced over the course of a day and generally over multiple days, such as a week, month, etc. The travelers may alternatively use a single use ticket which may allow one journey (with connections) possibly limited to a time period such as one hour. Information on the use of the transportation system by the travelers can be acquired by automatic ticketing validation (ATV) systems in the form of validation information, when the traveler's ticket is read by a ticket reading device on the transportation network. Each stop at which a traveler may enter the transportation system is generally associated with a respective ticket reading device, either on the transportation vehicle or at a fixed location at the stop, such that a traveler's origin stop on the network is detected, while his destination stop is generally not known by the transportation system, although it is assumed to be limited to a set of possible stops on the route traveled by the vehicle on which his ticket is last validated (at his origin stop or at a connecting stop) or from the fixed location where it was validated. In other instances, the destination stop of the traveler may be known by the transportation system, such information being collected from the traveler upon alighting of the vehicle.

A multi-goal trip, as used herein, is a trip on a transportation system between an origin and a destination that has one or more intermediate destinations between the origin and the ultimate destination. That is, a traveler may make several intervening stops between the origin and the destination that may not be necessary solely to travel between the origin and ultimate destination. For example, a traveler may accompany a child to school, where the traveler transfers from one route to another and back with the intention of ultimately arriving at work on the original route. Another example is an intentional stop at a shopping location on the way to work or school. Each stop on the trip may represent an individual goal. Stops where the traveler alights to board another vehicle on the way to the final destination may not all be individual goals and may reflect a simple transfer to continue on the trip to the final destination.

The present system and method aims to distinguish between multi-goal trips, each having two or more destinations as the goals of the trip, and simple transfer trips having only a single destination as the goal of the trip, in order to generate a more informative origin-destination matrix. For example, a traveler may take a train from the origin to a first stop and from there board a bus to a final destination. This transfer may not represent a choice on the part of the traveler to make a destination stop, but rather reflects that the most convenient route between the origin and destination involves a transfer, for example due to the train not traveling to the final destination. In contrast, a multi-goal trip may occur when a user alights at a train stop near a restaurant and boards the bus a substantial amount of time later. This time difference from that of the simple transfer example may indicate that the stop was intentionally selected and thus indicates a separate goal.

In one embodiment, validation information, which may include one or more of a ticket identification, a boarding location (e.g., derived from automatic vehicle location (AVL) information acquired from the vehicle), a vehicle (or route) identification, and a timestamp, is collected for every user of the transportation system, or at least a representative subset thereof. This data may include entry information corresponding to the boarding of a particular vehicle at a particular time, i.e., the origin stop. The validation information may also include alighting information, i.e., the destination stop (e.g., derived from the AVL information acquired from the vehicle) and timestamp (in the case of an entry-exit system). In some embodiments, the validation information does not include the alighting information (in the case of an entry-only system). In the entry-only embodiments, the destination stops may be inferred (predicted) using a discrete choice model that is used to select the most probable alighting stop for a traveler. A set of possible alighting stops is identified, based upon the route and schedule associated with the passenger's boarding (origin stop) and any subsequent stops (origins on the same or different routes). A probability is determined for each of the set of possible alighting stops using the discrete choice model, factoring in one or more of waiting times, walking times, stop location, stop loads, and the like, relative to the first origin stop and the next succeeding origin stop. The most probable alighting stop is then selected as the destination for the origin.

The validation information for a discrete time period, such as a day, includes a set of origin stop validations, destination stops (either validations or inferences), timestamps, and vehicle identifications, is acquired for all travelers on the system and used to generate, for a single user, a validation sequence. The validation sequence corresponds to a sequence of origin stops and destination stops, along with the respective timestamps associated therewith. The validation sequence may be segmented into subsequences, each of which corresponds to an origin and destination at a particular time. A trip planner, which may be configured to generate common trips (i.e., a set of origins and destinations from a first origin to a final destination), presents a set of trips between the origin and the destination of the subsequence. Each subsequence may then be analyzed relative to this set of trips to determine whether the subsequence constitutes a valid transfer trip. Any intermediate destinations of the subsequence are then analyzed and used to determine whether a multi-goal trip was undertaken. In the event that it is determined that a multi-goal trip was taken, each portion of the trip is used to contribute to the origin-destination matrix associated with the transportation system. A weight may be applied to contributions each multi-goal trip portion makes to the matrix.

The spatial and temporal information collected in the origin-destination matrix which takes into account these multi-goal trips may be used to estimate the demand on transportation systems and enable proper adjustment, planning, and/or construction associated with the transportation system.

Figure 1B:
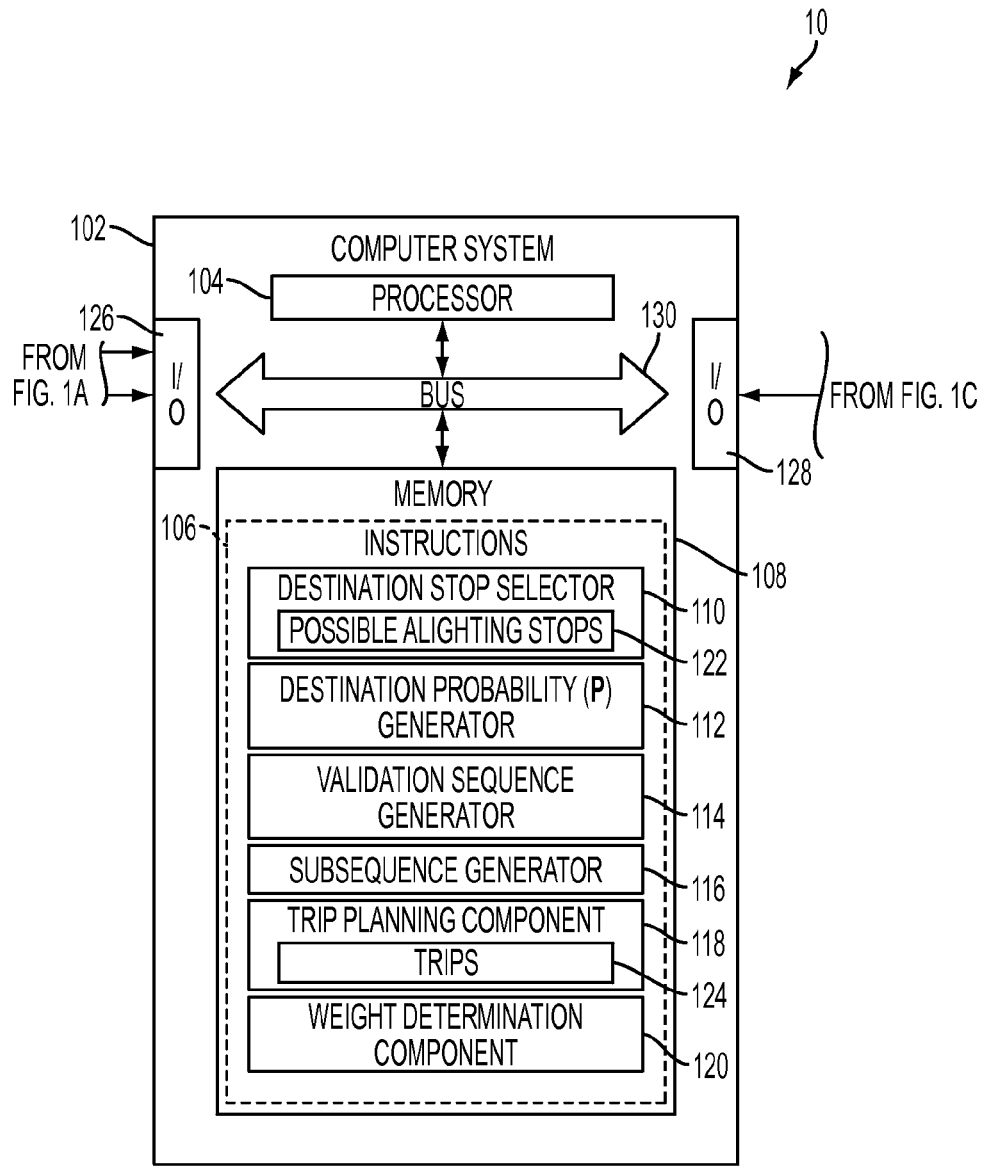
Figure 1C:
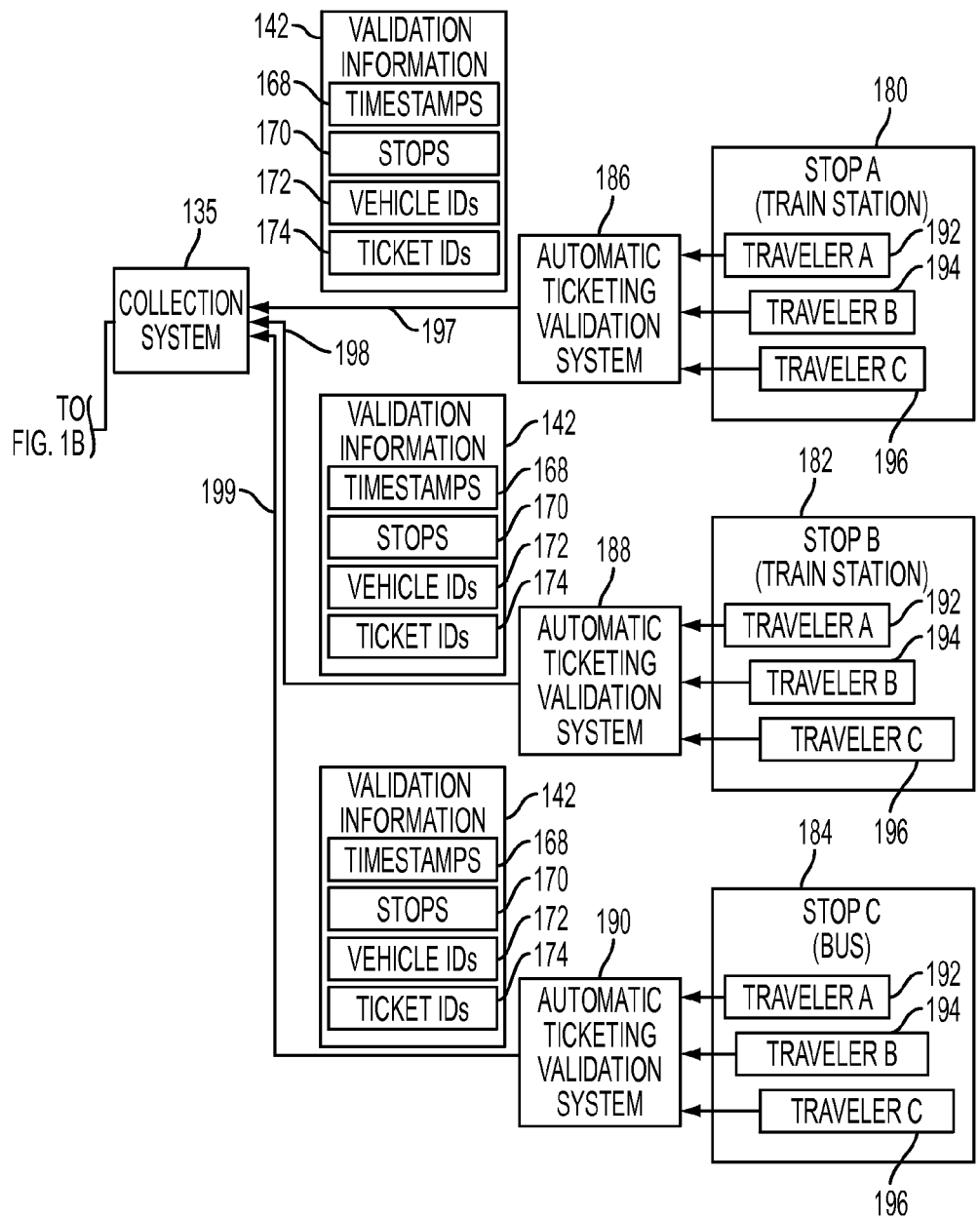

Referring now to FIGS. 1A-1C, there is shown a dynamic origin and destination matrix estimating system 10 configured for providing an origin/destination matrix 100 that accounts for multi-goal trips on a transportation system. Such origins and destinations may correspond to stations, points of interest, schools, shopping malls, sporting arenas, government offices, or the like, of a city serviced by the transportation system. It will be appreciated that the various components depicted in FIGS. 1A-1C are for purposes of illustrating aspects of the exemplary embodiment, and that other similar components, implemented via hardware, software, or a combination thereof, are capable of being substituted therein.

As shown in FIGS. 1A-1C, the origin and destination estimating system 10 includes a computer system 102, which is capable of implementing the exemplary method described below. The exemplary computer system 102 includes a processor 104, which performs the exemplary method by execution of processing instructions 106 which are stored in memory 108 connected to the processor 104, as well as controlling the overall operation of the computer system 102.

The instructions 106 include a destination stop selector 110 that determines a set of possible alighting stops 122 that could be a destination stop 171 for validation information 142 containing only boarding information, (i.e., only origin stops 170). The validation information 142 may be received from a collection system 135 which collects the information 142 from a set of automatic ticket validation (ATV) systems 186-190 associated with respective vehicles or stops on the transportation network. The destination stop selector 110 may select the set of alighting stops in accordance with predetermined routes 144, route schedules 146, route/vehicle stops 148, vehicles using the routes 150, walking distances/travel times 152 between stops 148, and the like. The set of alighting stops 122 may further be selected in accordance with the walking distances 152 of stops 148 on the route 144 of a first origin stop 170 and the location of the subsequent origin 170 in the validation information 142. Additional operations of the destination stop selector 110 will be better understood in conjunction with FIGS. 3-5B, discussed below.

The instructions 106 may also include a destination probability generator 112 that generates a probability (P) 154 for each possible alighting stop 122 that represents the probability that the stop 122 is the destination stop 171 corresponding to a given origin stop 170 (i.e., for entry-only systems). As discussed in greater detail below, the destination probability generator 112 may facilitate the selection of one of the possible alighting stops 122 as the destination stop 171 for a specific origin stop 170, based upon a discrete choice model that factors in various attributes 158, such as, for example, walking times 160 from an alighting stop 122 to a subsequent origin stop 170, waiting times 162 for the vehicle 150 at the subsequent origin stop 170, whether the alighting stop 122 is in a known location which is often a goal of travelers, such as shopping zone 164, the daily load 166 of travelers 192-196 through the alighting stop 122, and the like. The destination probability generator 112 may facilitate the selection of a stop 122 as the most probable destination stop 171 from a given origin stop 170, by implementing a discrete choice model, as discussed more fully with respect to FIGS. 3-5B.

The instructions 106 may further include a validation sequence generator 114 that generates validation sequences (V=(O,T,D) 176 for each traveler 192-196 of the transportation system 140 in accordance with the validation information 142, as discussed below. The validation sequences (V=(O,T,D) 176 are triples where O={$o_1, \ldots, o_n$} and D=, {$d_1, \ldots, d_n$} are origin stops 170 and destination stops 171 of unlinked trips and T={$t_1, \ldots, t_n$} is a sequence of boarding timestamps 168 corresponding to the origin stops 170. The validation sequence generator 114 may generate the validation sequences 176 from validation information 142 corresponding to any desired time period. For purposes of example, reference is made herein to the validation sequences 176 representing the daily validation sequences 176 of travelers 192-196 of the transportation system 140, i.e., a 24 hour period. Generation of the validation sequences 176 from the validation information 142 is discussed in greater detail below with respect to FIGS. 3-5B.

The instructions may also include a subsequence generator 116 that generates a set of subsequences ($V_{i,j}$) 178 from the validation sequence 176 corresponding to each traveler 192-196 of the transportation system 140. Each subsequence ($V_{i,j}$) 178 may corresponding to a single origin stop ($o_i$) 170, a destination stop ($d_j$) 171, and a time T($t_i$) corresponding to a timestamp 168 associated with the origin stop ($o_i$) 170 in the validation sequence 176. Thus, the set of subsequences ($V_{i,j}$) 178 may include a number of subsequences ($V_{i,j}$) 178, depending upon the number of origins 170 and destinations 171 in the validation sequence (V) 176.

The instructions may further include a trip planner component 118 that determines a set of trips 124 from an origin ($o_i$) 170 of a subsequence 178 to the corresponding destination ($d_j$) 171 of the subsequence 178 at the time (T($t_i$)). As discussed in greater detail below, the trip planner component 118 may facilitate the determination of one or more trips 124 between an origin stop ($o_i$) 170 and destination stop ($d_j$) 171 using the route plans 144, schedules 146, and services (e.g., bus, train, subway, etc.) associated with a transportation system 140. The trip planner component 118 may determine one or more trips 124 between the origin 170 and destination 171 of a subsequence 178 in accordance with an output of the subsequence generator 116. It will be appreciated that when determining a trip between an origin 170 and a destination 171, the trip planner component 118 may use an abstract model of the transportation system 140, i.e., a model based on the routes 144 and schedules 146, and in addition may use information indicating most frequently traveled trips, e.g., based on the number or proportion of travelers making a specific journey per day.

In addition, the instructions 106 may include a weight determination component 120 that is configured to apply a weighting schema 157 to entries in an origin-destination matrix 100. The weighting schema 157 may be applied to the identified multi-goal trips 161 determined from the subsequences 178, as discussed in greater detail below with respect to FIGS. 3-14.

The various components of the computer system 102 may all be connected by a data/control bus 130. The processor 104 of the computer system 102 is in communication with an associated database 136 via a link 138. A suitable communications link 138 may include, for example, the public switched telephone network, a proprietary communications network, infrared, optical, or other suitable wired or wireless data transmission communications. The database 136 is capable of implementation on components of the computer system 102, e.g., stored in local memory 108, i.e., on hard drives, virtual drives, or the like, or on remote memory accessible to the computer system 102.

The associated database 136 corresponds to any organized collections of data (e.g., validation information, probable locations, destination probabilities, vehicles, assignment functions, analysis period segments, routes, schedules, stop locations) used for one or more purposes. Implementation of the associated database 136 is capable of occurring on any mass storage device(s), for example, magnetic storage drives, a hard disk drive, optical storage devices, flash memory devices, or a suitable combination thereof. The associated database 136 may be implemented as a component of the computer system 102, e.g., resident in memory 108, or the like.

In one embodiment, the associated database 136 may include data corresponding to an associated transportation system 140, a collection of routes 144 (a sequence of stops 148 by an individual vehicle 150 along of a course of travel available on the transportation system 140), schedules 146 that pertain to the arrival/departure times of buses, trams, subways or other vehicles 150, etc., of the transportation system 140, walking distances 152, probabilities (P) 154, vehicle passage times 156 (times at which a vehicle 150 passes a stop 148 on the transportation system 140), weighting schema 157, attributes 158, origin-destination matrix 100, multi-goal trips 161, and validation information 134.

The attributes 158 may include walking times 158, waiting times 160, shopping zones 162, and station loads 164.

The validation information 142 may correspond to ticket validations collected by a collection system 135 from various collection components (e.g., the ATV systems 186, 188, and 190 respectively located at stop A 180, stop B 182, stop C 184, and the like), and comprise, for example, boarding timestamps 168, stops 170 representative of bus stops, stations, or the like, at which a traveler 192-196 boarded a vehicle 150, vehicle identifications 172 corresponding to the bus, train, or other type of transportation vehicle 150 on which the traveler 192-196 associated with the validation information 142 validated a ticket, and ticket identifications 174 corresponding to each ticket validated on the transportation system 140.

The validation information 142 collected by the data collection system 135 may correspond to users of the transportation system 140, such as each ticket's unique identification 174 (e.g., the ticket identification 174 may be derived from a smart card, a transit card, transit ticket, or the like, that cannot be rewritten or otherwise altered by the user (anti-counterfeiting properties)), origin stops (o) 170 (boarding stops at which the ticket was used, i.e., validated), vehicle identifications 172 (a vehicle identification associated with the vehicle 150 boarded by the traveler 192-196 on which or at which the ticket was validated), and timestamps 168 associated with the actual times each ticket identification 174 was used. That is, each set of validation information 142 may include the time of entry of the traveler 192-196 on the public transportation along with the corresponding origin stop (o) 170 or route 144 (i.e., vehicle identification 172 which may be cross referenced with the schedule 146 to ascertain the origin station/stop (o) 170 on the route 144) at which the traveler 192-196 boarded, and the like. While each traveler 192-196 on a public transportation system 132 is generally a person, users of other networked transportation systems may include goods or other inanimate objects. In some embodiments, the stops of the validation information 142 may include both origin stops (o) 170 and destination stops (d) 171.

Each origin stop (o) 170 of the validation information 142 may include one or more of a route identifier e.g., a route number, a stop identifier, e.g., a stop number, an address, GPS coordinates, or other geographical identification information associated with the location. The time component of the stamp 168 may include one or more of a time of day, a day, a date, or other temporal information corresponding to the stamp 168. The collected validation information 142 used in the method may thus be ticketing data, collected via usage of prepaid cards, single use transit tickets, reloadable transit cards, or other ticketing devices. The vehicle identifications 172 may reflect a bus number, train number, car number, or other identifier associated with each vehicle 150 on the transportation system 140.

Figure 2:
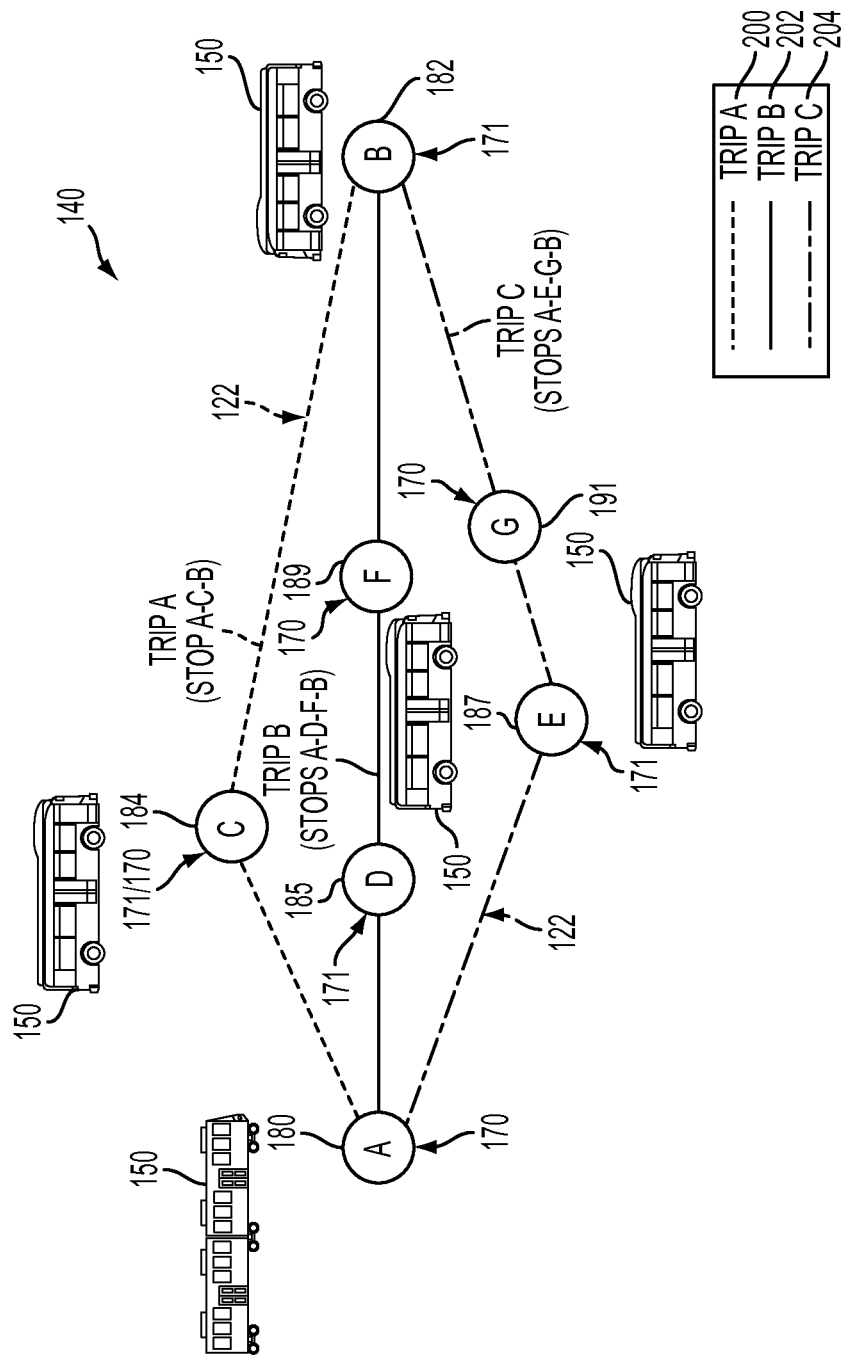
FIG. 2 is a functional diagram of part of an example transportation system with which the origin and destination matrix estimating system can be used.

The validation information 142 may be collected from a plurality of locations, illustrated in FIGS. 1A-1C as stop A 180, stop B 182, and stop C 184. Each of these locations 180-184 may correspond to a respective one of a finite set of stops 148 (e.g., train stations or ATV locators on vehicle 150) connected by the transportation system 140. As shown in FIG. 2, stops A and B 180-182 are representative train stations on the transportation system 140, whereas stop C 170 is representative of a bus operating on the transportation system 140. It will be appreciated that the collection of such information 142 may be performed by ticket validation machines for fare collection, i.e., ATV systems 186, 188, and 190 at each respective station 180, 182, and 184, such as smart card readers, magnetic card readers, input terminals, ticket dispensers, ticket readers, and the like, and may include boarding (origin) information only, i.e., no destination information is collected other than it can be assumed that the user exited at one of the predetermined stops. It will be appreciated that such ATV systems 186, 188, and 190 may be implemented at stations 180, 182, and, on vehicles (e.g., bus 150) shown in FIGS. 1A-1C as 184, etc., and may represent automatic fare collection (AFC) subsystems.

Travelers 192-196 on the transportation system 140 may use persistent transportation cards/tickets, e.g., tickets having multiple day usage, i.e., 10 day, 30 day, monthly, bi-monthly, semi-annually, etc., or use non-persistent cards/tickets, e.g., tickets having limited usage, i.e., single hour usage, single day, single trip, etc. The travelers 192-196 may use respective tickets to pay for or otherwise enable travel on the transportation system 140, which may be scanned, read, inserted in, or otherwise detected by the ATV systems 186, 188, and 190 as the travelers 192-196 travel on the transportation system 140. Such transportation cards may include smart card-like capabilities, e.g., microchip transmissions, magnetically stored data, and the like. In such embodiments, the ATV systems 186-190 communicate validation sequence information 140 to the collection system 135 and thereafter to the computer system 102 via respective links 197, 198, and 199. Suitable communications links 197, 198, and 199 may include, for example, the public switched telephone network, a proprietary communications network, infrared, optical, or any other suitable wired or wireless data transmission communications.

Additional information may be collected by the ATV systems 186-190 corresponding to ticketing operations including transportation usage data, ticketing receipt data, congestion data, and the like. According to one embodiment, electronic validation records pertaining to the entry of travelers 192-196 onto a vehicle 150 of the transportation system 140 may be collected as the validation information 142. It will be appreciated that the destinations of travelers 192-196 in an entry-only system are not generally known or readily apparent from the automatic ticketing validation data, i.e., the validation information 140 collected by automatic ticket validation (ATV) systems 186-190. The destinations may be discerned through inferences based upon non-validation data, including information regarding the route 144 and schedules 146, the stops 148 on the route 144, and certain traveler assumptions, as set forth in greater detail below with respect to FIGS. 3-6.

Some passengers may use one-trip tickets, rather than prepaid cards, which are reflected in the ticket identifications 174 included in the collected validation information 142. It will be appreciated that a one trip ticket may have a fixed validation time, i.e., a period of time during which the ticket remains valid for use by a traveler. For example, the time during which the ticket is valid may be limited to 1 hour from the time of issuance/purchase, during which time travelers 192-196 may change vehicles 150 within the transportation network 140 without incurring an additional charge. The first validation of such a ticket may be identified by a sequence tag indicating 'First', whereas the second and subsequent validations during this validation time may be identified by a sequence tag indicating 'Correspondence'. The correspondence tag can be used to infer that the traveler's destination was not the traveler's destination except, for example, when the traveler retraces his route in the opposite direction with a one hour time period. The ATV systems 186-190 may allow for the use of multiple entry cards, which may provide for multiple entries by a traveler

192-196 and long-term permanent cards to requesting travelers. It will be appreciated that the use of single and multiple entry cards may permit tracking traveling data of each card holding traveler 192-196, as well as allowing for time-based analysis of such travelers 192-196.

The ATV systems 186-190 may allow for location identification, corresponding to the entry of a traveler 192-196. For example, the ATV systems 186-190 may enable each validation of a ticket to include a ticket identification 174 (a unique identification which may be considered a user ID), vehicle identification 172, stop (o) 170, and timestamp 168. Additionally, the automatic ticket validation systems 186-190 can use automatic vehicle location subsystems to associate a ticket validation with the public transportation route 144, stop (o) 170 (e.g., vehicle 150, stations 180-184, etc.) and direction. Other methods for collecting validation information 142 may alternatively or additionally be used, including, mobile communication events, e.g., time-stamped antenna authentication sequences or other observations of the intersecting of scheduled activities and traveler schedules. It will further be appreciated that the ticket validations, i.e., the validation information 142 collected in the ATV systems 186-190 may provide information for understanding the traveler flows in the transportation system 140. Information in a typical installation can be analyzed in order to provide valuable insights for the transit and public transportation agencies and assist in decision making processes.

The validation information 142 associated with the implementation of FIGS. 1A-1C are for example purposes only. Other applications outside of the public transportation example are also contemplated. For example, toll-road monitoring and management systems may also take advantage of the subject systems and methods, whereby validation information 142 is collected at toll-booths, upon entry a vehicle with respect to the associated toll road. Other embodiments, e.g., hospital monitoring of patient/employee entries and exits, secure facility monitoring, and the like, are also contemplated.

The computer system 102 may include one or more input/output (I/O) interface devices 126 and 128 for communicating with external devices. The I/O interface 126 may communicate with one or more of a display device 132, for displaying information, such estimated destinations, and a user input device 134, such as a keyboard or touch or writable screen, for inputting text, and/or a cursor control device, such as mouse, trackball, or the like, for communicating user input information and command selections to the processor 104.

It will be appreciated that the dynamic origin and destination matrix estimating system 10 is capable of implementation using a distributed computing environment, such as a computer network, which is representative of any distributed communications system capable of enabling the exchange of data between two or more electronic devices. It will be further appreciated that such a computer network includes, for example and without limitation, a virtual local area network, a wide area network, a personal area network, a local area network, the Internet, an intranet, or the any suitable combination thereof. Accordingly, such a computer network comprises physical layers and transport layers, as illustrated by various conventional data transport mechanisms, such as, for example and without limitation, Token-Ring, Ethernet, or other wireless or wire-based data communication mechanisms. Furthermore, while depicted in FIGS. 1A-1C as a networked set of components, the system and method are capable of implementation on a stand-alone device adapted to perform the methods described herein.

The computer system 102 may include a computer server, workstation, personal computer, cellular telephone, tablet computer, pager, combination thereof, or other computing device capable of executing instructions for performing the exemplary method.

According to one example embodiment, the computer system 102 includes hardware, software, and/or any suitable combination thereof, configured to interact with an associated user, a networked device, networked storage, remote devices, or the like.

The memory 108 may represent any type of non-transitory computer readable medium such as random access memory (RAM), read only memory (ROM), magnetic disk or tape, optical disk, flash memory, or holographic memory. In one embodiment, the memory 108 comprises a combination of random access memory and read only memory. In some embodiments, the processor 104 and memory 108 may be combined in a single chip. The network interface(s) 126, 128 allow the computer to communicate with other devices via a computer network, and may comprise a modulator/demodulator (MODEM). Memory 108 may store data the processed in the method as well as the instructions for performing the exemplary method.

The digital processor 104 can be variously embodied, such as by a single core processor, a dual core processor (or more generally by a multiple core processor), a digital processor and cooperating math coprocessor, a digital controller, or the like. The digital processor 104, in addition to controlling the operation of the computer 102, executes instructions 106 stored in memory 108 for performing the method outlined in FIGS. 3-5B.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

FIG. 2 provides an example of trips 122 in a transportation system 140 between a first origin stop ($o_1$) 170 (depicted as stop A 180) and a last destination stop ($d_n$) 171 (depicted as stop B 182). The transportation system 140 of FIG. 2 illustrates three trips 122 (depicted as trip A 200, trip B 202, and trip C 204) between the first origin stop ($o_1$) 170 at stop A 180 and the last destination stop ($d_n$) 171 at stop B 182. Trip A 200 depicts travel between stops A and B 180, 182 with a transfer at another stop (s) 170/171, depicted as stop C 184, e.g., a user 192-196 boards a vehicle 150, e.g., a train, at stop A 182, boards another vehicle 150 (e.g., a bus) at a subsequent origin stop ($o_2$) 170, shown as stop C 184, and completes the journey to the final destination stop ($d_n$) 171 at stop B 182. It will be appreciated that the alighting at the destination stop ($d_n$) 171 of stop C 184 and at stop B 182 are not recorded. However, the boarding of another vehicle at stop C 170 is captured in the validation information 142 for the corresponding user 192-196. Similarly, the alighting of the user 192-196 at stop B 168 is not recorded, however, the inferring of stop B 170 as an intermediate destination stop ($d_1$) 160 is performed in accordance with the method of FIGS. 3-5B, set forth in greater detail below.

Similarly, trip B 202 depicts a sequence of stops 148 of a user 192-196, shown as travel between stations A and B 180, 182 with a transfer at another stop 148, depicted in FIG. 2 as station D 185. That is, a user 192-196 boards a vehicle 150 at an origin stop (o) 170 (stop A 180), alights at a destination stop ($d_1$) 171 at stop D 185, walks to stop F 189 (an origin stop ($o_2$) 170), and completes the journey to stop B 182 on a vehicle 150 boarded at stop F 189. As briefly addressed above, the determination of destination stops ($d_1$, $d_n$) 171 at station D 185 and stop B 182 are made based upon inferences made in accordance with FIGS. 3-6 as discussed below. FIG. 2 also illustrates a third trip 124, trip C 204, which depicts travel between stations A and B 180, 182 with an inferred alighting at a destination stop ($d_1$) 171, stop E 187, walking by the traveler 192-196 to stop G 191 (an origin stop ($o_2$) 170) and completing the trip to stop B 182 on a vehicle 150 boarded at stop G 191. The validation information 142 may then indicate a boarding of another vehicle 150 (e.g., a bus) at station F 191, which may be indicative of an alighting at stop E 187 (as inferred in FIGS. 3-6), following which the traveler 192-196 completes trip C 204 to stop B 182, as inferred from the validation information 142 discussed below.

Figure 3:
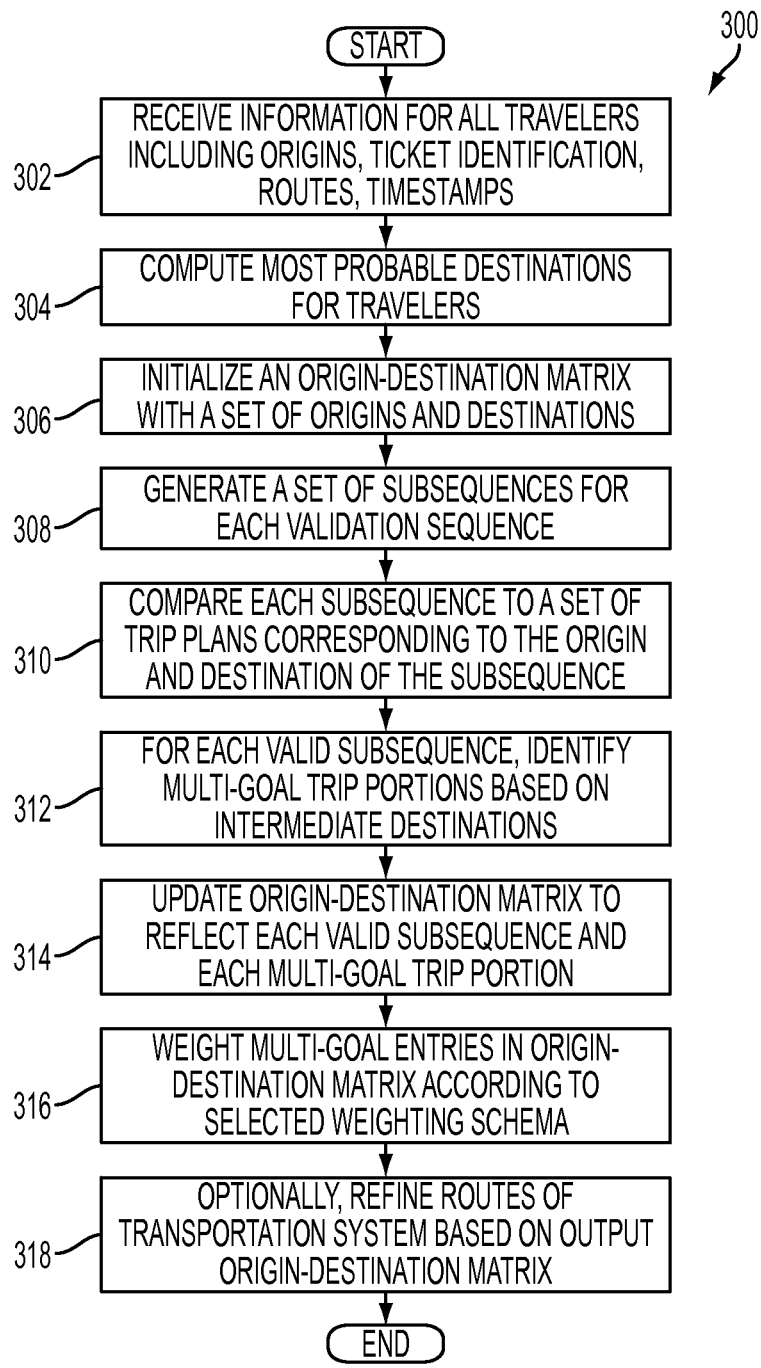
FIG. 3 is a flowchart which illustrates a method for origin and destination matrix estimating for a transportation network in accordance with another aspect of the exemplary embodiment.

Turning now to FIG. 3, there is shown an overview of the exemplary method 300 shown in greater detail FIGS. 4A-5B for dynamically estimating an origin and destination matrix 100 of the transportation system 140. At 302, information is received for all (or at least a subset) of travelers 192-196 of the transportation system 140. This information may include, for example, origins, ticket identification, routes, timestamps, and the like, as discussed above. At 304, the most probable destinations for travelers 192-196 are computed (see FIGS. 4A-4B).

At 306, an origin/destination matrix may be initialized, based on the origin information acquired at 302, and corresponding probable destination information generated at 304, or simply a set of origins and destinations of interest.

At 308, for those travelers having more than one recorded origin 170 in the validation sequence, a set of subsequences 178 is generated from the validation sequence 176 for each traveler 192-196, each subsequence including an origin stop 170, an inferred destination stop 171 (based on 304 and FIGS. 4A-4B), and a corresponding time ($T(t_i)$). Each subsequence 178 is then compared (by the trip planner) to a set of trip plans 124 correspondingly generated from the origin 170 to the inferred destination stop 171 of the subsequence 178 at 310 so as to determine the validity of the subsequence 178 as a transfer trip.

Figure 5B:
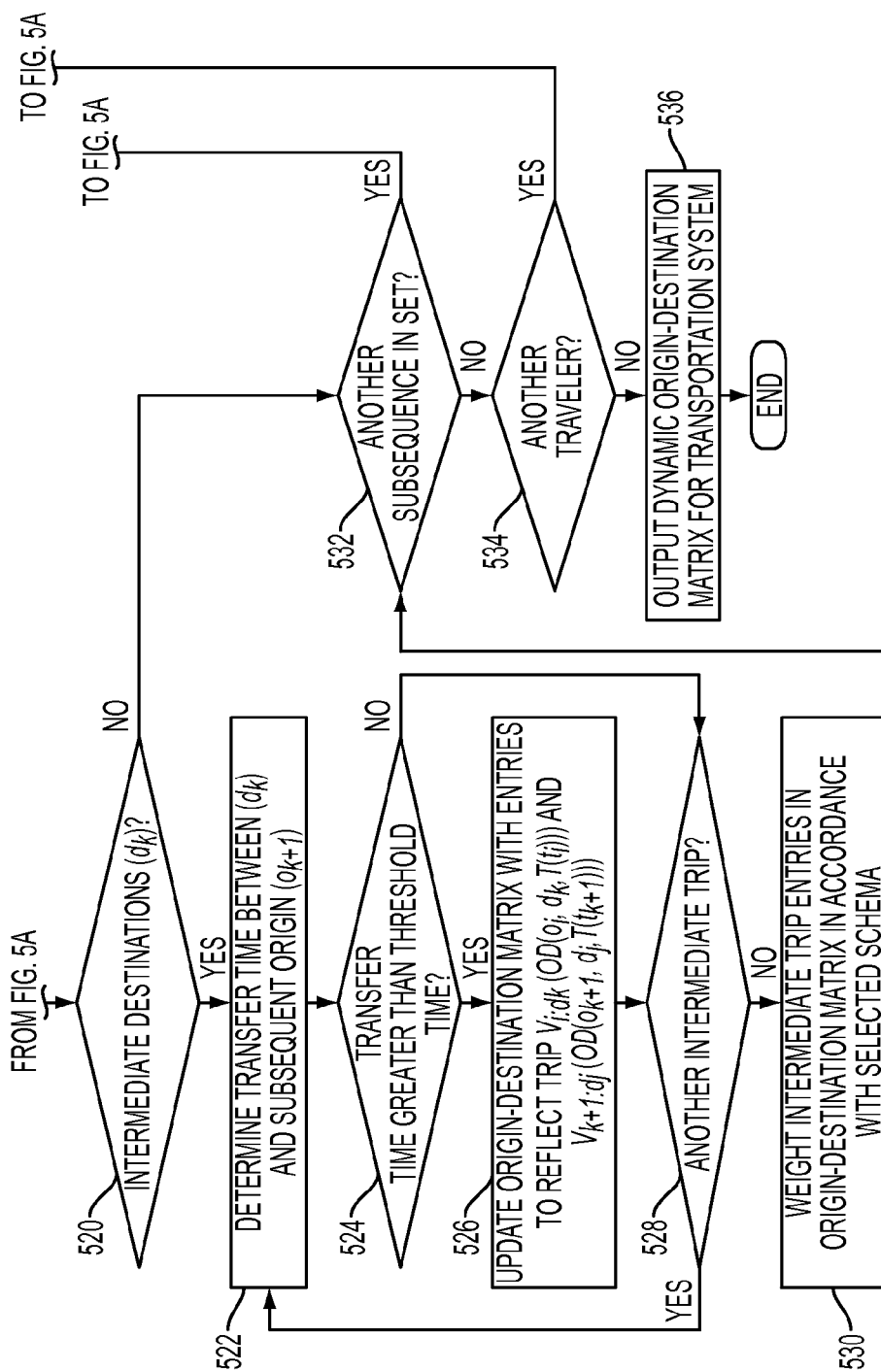

For each valid subsequence 178, probable multi-goal trip portions 161 are identified at 312 in accordance with the destination stops 171 contained therein (see FIGS. 5A-5B).

The origin-destination matrix 100 is then updated at 314 to reflect each valid subsequence 178 and each probable multi-goal trip portion 161. The origin-destination matrix may also reflect the trips which include a single origin and destination.

At 316, each multi-goal trip portion 161 may be weighted in the origin-destination matrix 100 according to a selected weighting schema 157, as illustrated more fully in FIGS. 5A-5B.

In this way, the O-D matrix 100 is able to reflect all trips between an origin and a destination, unless, in combination, they constitute valid transfer trips which as a combination, are considered a single trip, except to the extent that the valid transfer trip is likely to be a multi-goal trip.

Optionally, at 318, the routes 144 of the transportation system 140 are refined based on the output origin-destination matrix 100.

Figure 4A:
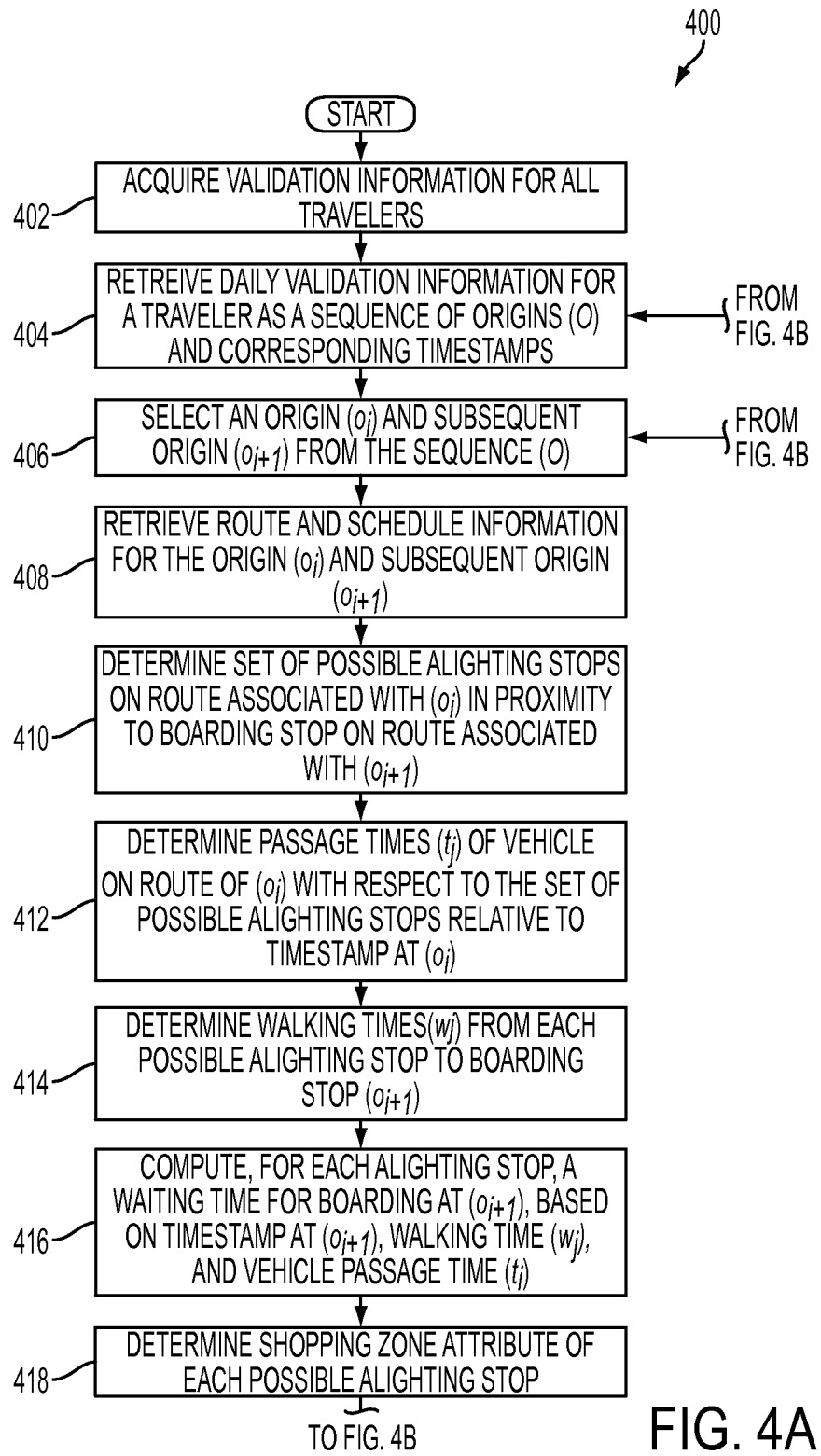
FIGS. 4A-4B is flowchart which illustrates part of the method of FIG. 3, in accordance with one aspect of the exemplary embodiment.
Figure 4B:
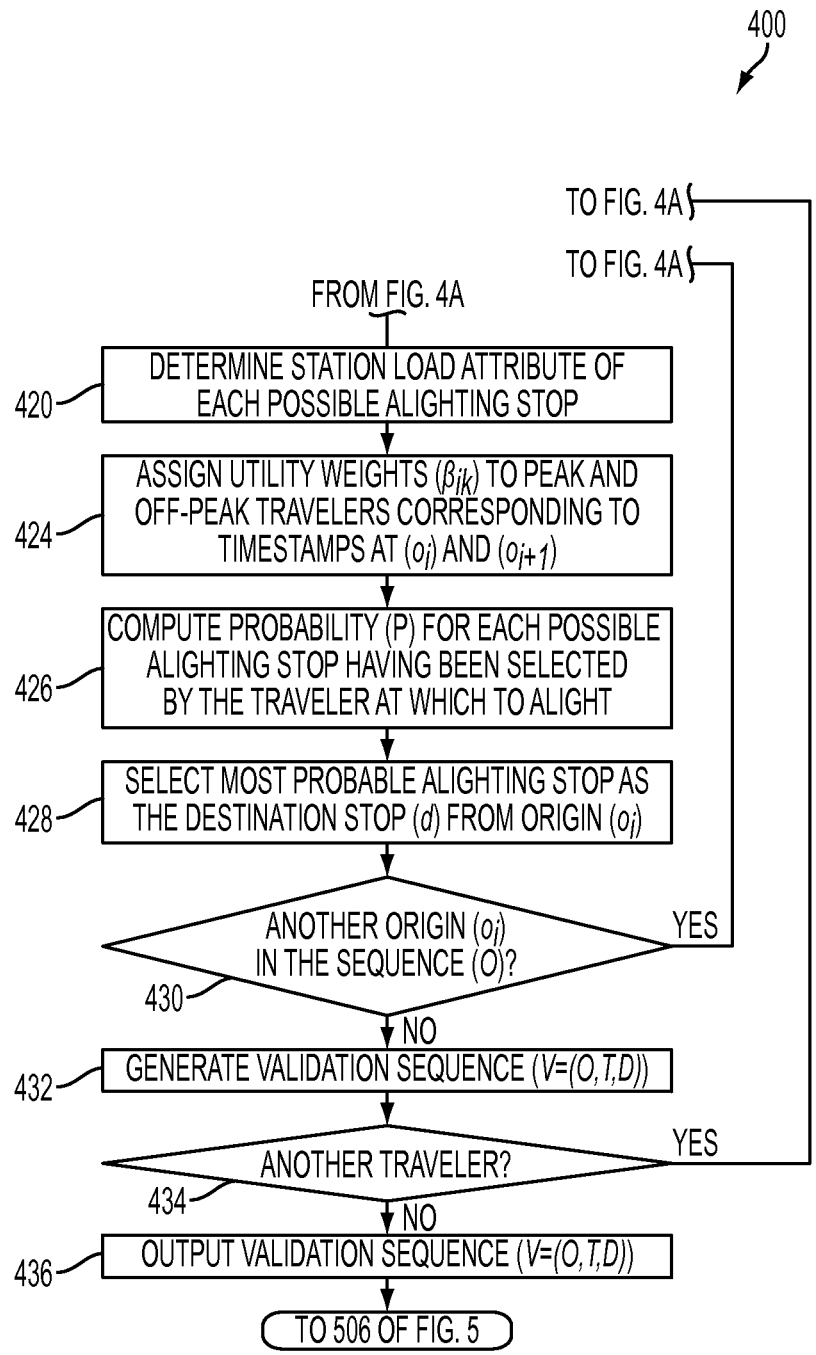

FIGS. 4A-4B illustrate the prediction (FIG. 3, 304) of destination stops 171 for each traveler 192-196 associated with the validation information 142, for example, in an entry-only transportation system 140. The prediction, or inference, of the destination stops 171 for each traveler 192-196 may be made in accordance with various possible prediction methods. FIGS. 4A-4B illustrates steps implemented by the exemplary discrete choice model 112. However it will be appreciated that other methods may be implemented to predict a destination for a particular origin.

Discrete choice models are statistical procedures that model choices made by people among a finite set of alternatives, and have been used in the past for modeling which mode of transport (car, bus, rail) to take, given a set of alternatives. Discrete choice models statistically relate the choice made by each person to the attributes of the alternatives available to the person and, where available, attributes of the person. In determining the probable destination stop 171 (the stop at which a traveler 192-196 alights from a vehicle 150), the set of choices of stops which may be considered by the model 112 includes one or more possible alighting stops 122 for a traveler 192-196 deciding to change a route, to do some shopping, or fulfill some other goal.

The discrete choice model 112 computes the probability that a particular alternative will be selected, with the probability expressed as a function of observed variables that relate to both the alternatives and the person making the selection, in this instance the traveler 192-196. Generally, the probability $P_{ij}$ that a person i chooses alternative j (destination stop) may be expressed as follows:

$$P_{ij}=G(x_{ij}, x_{im} \forall j \neq m, s_i, \beta) \qquad \text{Eq. (1)},$$

where $x_{ij}$ represents a vector (set) of stop attributes for a first alternative j faced by a person i;

$x_{im}$ represents a vector (set) of stop attributes for a second alternative m faced by a person i;

$s_i$ represents a vector of characteristics of the person i;

$\beta$ is a set of parameters that relate the variables to probabilities, which may be statistically estimated; and G represents a function.

As applied to the embodiments discussed herein, the stop attributes ($x_{ij}$, $x_{im}$) 158 may include the travel or walking time ($w_j$) 160, the waiting time 162, the proximity to a shopping zone 164, the daily station load 166, and the like. Examples of these attributes 158, or weights, are discussed more fully below with respect to FIGS. 4A-4B. The characteristics of the travelers 192-196 ($s_i$) used to compute choice probabilities may be the line most recently boarded by the passenger, the time of day, e.g., peak or off-peak time, and the like.

Discrete choice models may be derived from utility theory which gives a precise meaning to the probabilities $P_{ij}$ and provides the basis for calculation of changes in consumer surplus from changes in the attributes of the alternatives. $U_{ij}$ is representative of the utility (or well-being) that person i obtains from choosing alternative j. For convenience, the behavior of the person is considered to be utility-maximizing: person i chooses the alternative that provides the highest utility. The choice of the person is designated by variables $y_{ij}$, for each alternative j=1, . . . , J, as follows:

$$y_{ij} = \begin{cases} 1, & \text{if } U_{ij} > U_{im} \quad \forall m \neq j, \\ 0, & \text{otherwise,} \end{cases} \qquad \text{Eq. (2)}$$

The person's choice may depend on both observed and unobserved factors. The utility that the person obtains from choosing an alternative is decomposed into a part that depends on observed variables and a part that depends on non-observed variables. Assuming that the dependency is in linear form, the decomposition may be expressed as:

$$U_{ij}=X_j\beta_i+\epsilon_{ij},\quad \text{Eq. (3),}$$

where $X_j$ is a vector of observed variables relating to alternative j, $\beta_i$ is a corresponding vector of utility weights that a person i applies to the attributes and the observed variables, and $\epsilon_{ij}$ captures the impact of all unobserved factors. The $\epsilon_{ij}$ may be independent across alternatives and to have equal variance for all alternatives.

The utility weight $\beta_{ik}$ that person i assigns to attribute k, may be expressed as:

$$\beta_{ik}=\beta_k+\sigma_k\mu_{ik},\text{for } k=1,\ldots,K, i=1,\ldots,N,\quad \text{Eq. (4)}$$

where $\mu_{ik} \sim N(0,1)$, so that $\beta_{ik} \sim N(\beta_k, \sigma_k)$. It will be appreciated that while choice probabilities may take complex integral forms when the number of alternatives is three or more, analytical evaluation is time consuming. Accordingly, a simulation technique may be implemented in place of these complex integral forms, which smoothes the simple frequency values. In this approach, for D random draws for $\mu_i$, denoted $\mu_i^d$, for $d=1,\ldots,D$, a simple frequency estimator may be formulated as follows:

$$P(y_{ij}=1\mid X,\beta,\sigma)=\frac{1}{D}\sum_{d=1}^{D}\frac{\exp(X_j(\beta+\sigma\mu_i^d))}{\sum_{m=1}^{j}\exp(X_m(\beta+\sigma\mu_i^d))}.\quad \text{Eq. (5)}$$

The discrete choice model, which assigns exactly one of a set of possible alternatives as the choice of a passenger, e.g., based on the probability illustrated in Eq. (5), may be implemented in the inference of an alighting stop 122 of a traveler 192-196, as set forth in FIGS. 4A-4B.

Referring now to FIGS. 4A-4B, a flowchart 400 illustrates part of the method for estimating dynamic origin and destination matrices for multi-goal trips from validation information 142 on a transportation system 140. Operations of FIGS. 4A-4B (and FIGS. 5A-5B as discussed below) may be better understood in conjunction with ALGORITHM 1 (detailed below with respect to FIGS. 5A-5B) and the example implementation of FIGS. 6 and 7. Operations begin at 402, where validation information 142 from the ATV systems 186-190 is received, which validation information 142 corresponds to the boardings of each traveler 192-196. In the example implementation of FIGS. 4A-4B, validation information 142 is received for travelers 192-196 having a persistent ticket identification 174, such as a monthly or yearly pass, for travelers using single use or hourly passes, such that the same traveler may have different ticket identifications 174, or a combination thereof. The validation information 142 received at 402 in FIGS. 4A-4B may include entry-only information, i.e., only origin stops 170 and timestamps 168 are collected by the ATV systems 186-190, or entry-exit validation information, i.e., origin and destination stops 170-171 as well as corresponding timestamps 168, or both.

Thus, at 404, a determination is made whether the transportation system 140 includes entry-only validation information. That is, whether the validation information 142 collected for the transportation system 140 includes only origin stops 170 (i.e., an entry-only system) or origin and destination stops 170-171 (i.e., an entry-exit system). Upon a determination that the validation information 142 was collected from only entry-exit type automatic ticketing validation systems, operations proceed directly to 502 of the flowchart 500 of FIGS. 5A-5B.

Reference may be made hereinafter to the validation information 142 as including boarding information (origin stops (o$_i$) 170, vehicle identifications 172, etc.) with the corresponding timestamps 168, for each traveler 192-196 (e.g., ticket identifications 174), or a subset of the travelers 192-196 depending upon whether both entry-only and entry-exit systems are combined in the transportation system 140. With respect to FIGS. 4A-4B, the validation information 142 may correspond to a sequence of origin stops 170 and corresponding timestamps 168.

When it is determined at 404 that at least a portion of the validation information 142 includes validations having only origin stops (o$_i$) 170, operations proceed to 406. At 406, validation information 142 associated with a traveler 192-196 is retrieved from the associated database 136. As referenced above, the validation information 142 corresponds to daily transactions for each traveler 192-196 of the transportation system 140, accordingly, with respect to FIGS. 4A-4B, the daily validation information 142 associated with each traveler 192-196 is analyzed as set forth below.

An origin stop (e.g., (o$_i$)) 170 and a subsequent origin (e.g., o$_{i+1}$) 170 are the selected from the sequence of origin stops (o) 170 and timestamps 168 of the validation information 142 at 408. At 410, route 144 and schedule 146 information are retrieved from the associated database 136 corresponding to the set of origin stops (o) 170 and the associated timestamps 168. The route 144 and schedule 146 may be identified by the origin stop (o$_i$) 170 and timestamp 168 or the vehicle identification 172 and timestamp 168 contained in the daily validation information 142 of the traveler 192-196. A set of possible alighting stops 122 is then determined at 412 by the destination stop selector 110 representative of possible destination stops (d) 171 at which the associated traveler 192-196 may have exited the vehicle 150 associated with the first origin stop (o$_i$) 170 enabling the passenger to board a vehicle 150 at the subsequent origin stop (o$_{i+1}$) 170. That is, the destination stop selector 110 may use the route 144 associated with the first origin stop (o$_i$) 170 to identify a set of possible alighting stops 122 on the route 144 of the first origin stop (o$_i$) 170 at which the traveler 192-196 may have alighted. The set of possible alighting stops 122 is further determined using the route 144 on which the subsequent origin stop (o$_{i+1}$) 170 is located. The selection of the set of possible alighting stops 122 by the destination stop selector 110 may further be made based upon the relative physical proximity of stops 148 on the route 144 of the first origin (o$_i$) 170 relative to the boarding stop indicated by the subsequent origin stop (o$_{i+1}$) 170.

At 414, using the route 144, and optionally the schedule 146 information, associated with the first origin stop (o$_i$) 170, the destination stop selector 110 determines the vehicle passage times (t$_j$) 156 at which the vehicle 150 boarded by the traveler 192-196 on the route 144 of the first origin stop (o$_i$) 170 passes the set of possible alighting stops 122 relative to the timestamp 168 associated with the boarding by the traveler 192-196 at the subsequent origin stop (o$_{i+1}$) 170. It will be appreciated that this determination may be made based upon timestamps 168 of other travelers 192-196 boarding at each of the possible alighting stops 122, or determined from the timestamp 168 of the boarding of the traveler 192-196 at the first origin stop ($o_i$) 170 relative to the schedule 146 associated with the vehicle 150 boarded.

The walking times ($w_j$) 160 (as set forth in Eq. (5) and explained in detail below with respect to FIG. 6) from each possible alighting stop 122 to the subsequent origin stop ($o_{i+1}$) 170 are then determined at 416. The walking times ($w_j$) 160 may be estimated in accordance with a preset speed and known distance (e.g., the walking distance 152 referenced above) between each stop 148 on the route 144 associated with the first origin stop ($o_i$) 170 and corresponding stops 148 on the route 144 associated with the subsequent origin stop ($o_{i+1}$) 170, and may be already stored in memory. At 418, a waiting time 162 is computed for each of the set of possible alighting stops 122 corresponding to the boarding time at the subsequent origin stop ($o_{i+1}$) 170 minus ($t_j$) the vehicle passage time (when the vehicle 150 passed the alighting stop 122) minus the walking time ($w_j$) 160 from the alighting stop 122 to the subsequent origin stop ($o_{i+1}$) 170.

At 420, a zone attribute 164 for each of the possible alighting stops 122 is determined. The zone attribute 164 may be determined in accordance with the geophysical location of the possible alighting stop 122 relative to a location of typical user interest, such as a shopping center, mall, or the like. It will be appreciated that while shopping zone attributes 164 are applied in one embodiment, other possible city zones may equally be implemented, e.g., restaurant zones, government center zones, or the like, each of which may be indicative of a multi-goal trip, i.e., stopping at an intermediate destination during travel to an ultimate destination. At 422, the station load 166 for each possible alighting stop 122 is determined. The station load 166 may correspond to the number of boardings (ticket validations) made at each possible alighting stop 122 during the day under analysis, i.e., the daily number of boardings at the possible alighting stop 122. In one embodiment, an assumption may be made that the number of boardings recorded at a possible alighting stop 122 may be correlated to the number of alightings at the same stop 122, as depicted with respect to FIG. 6 discussed below.

At 424, utility weights ($\beta_{ik}$) 163, (as defined in Eq. 4 discussed above) are assigned to peak and off-peak travel corresponding to the boarding timestamps 168 respectively associated with the first origin stop ($o_i$) 170 and the subsequent origin stop ($o_{i+1}$) 170. That is, when a boarding is made during peak travel times, e.g., morning rush hour, lunch, evening rush hours, or off-peak travel times, e.g., between the peak travel times, different weights may be accordingly applied. This assignment may be performed manually or automatically, and suitable examples of such weights ($\beta_{ik}$) 163 can be generated by providing two (or more) groups of travelers, e.g., i=1,2 (peak and off-peak) and two or more attributes, such as k=1, . . . 4, for example.

A probability (P) 154 is then computed by the destination probability generator 112 at 426 for each of the set of alighting stops 122 as having been selected by the traveler 192-196 as the alighting stop 122 associated with boarding of the traveler 192-196 at the subsequent origin stop ($o_{i+1}$) 170. That is, a probability (P) 154 for each of the possible alighting stops 122 is computed which indicates the likelihood that that a particular stop 148 was selected as the destination stop (d) 171 from the first origin stop ($o_i$) 170. The most probable alighting stop 122, as indicated by its probability (P) 154 relative to the other alighting stops 122, is then selected at 428 as the destination stop (d) 171 from the first origin ($o_i$) 170, e.g., as described above with respect to Eq. (5).

At 430, a determination is made whether another origin stop (o) 170 remains in the received validation information 142. That is, whether all stops 148 in the validation information 142 have been processed to determine the corresponding destination stops (d) 171. Upon a negative determination at 430, operations return to 408 for selection of the next origin stop ($o_{i+k}$) 170 contained in the validation information 142. When it is determined at 430 that no additional origin stops (o) 170 remain, the validation sequence generator 114 generates a validation sequence (V=(O,T,D) 176 associated with the traveler 192-196 at 432. As discussed above, the daily validation sequence (V=(O, T,D) 176 is a triple, wherein O={$o_1$, . . . , $o_n$} and D={$d_1$, . . . , $d_n$} are origin stops (O) 170 and destination stops (D) 171 of unlinked trips 124 and T={$t_1$, . . . , $t_n$} is a sequence of boarding timestamps 168 corresponding to the origin stops (O) 170. Linking of the trips 124 contained in the validation sequence (V=(O,T,D) 176 is performed at 310 and 312 (FIG. 3), in accordance with the trip planning component 118, as set forth in greater detail below with respect to FIGS. 5A-5B.

A determination is then made at 434 whether another traveler 192-196 remains with respect to the acquired validation information 142 of all travelers 192-196 on the transportation system 140. When another traveler 192-196 remains, operations return to 406, whereupon the daily validation information 142 associated with that traveler 192-196 is retrieved and 408-432 are performed accordingly. Upon a negative determination at 434, the validation sequences 142 are output to 506 of FIGS. 5A-5B, as discussed in greater detail below.

Figure 6:
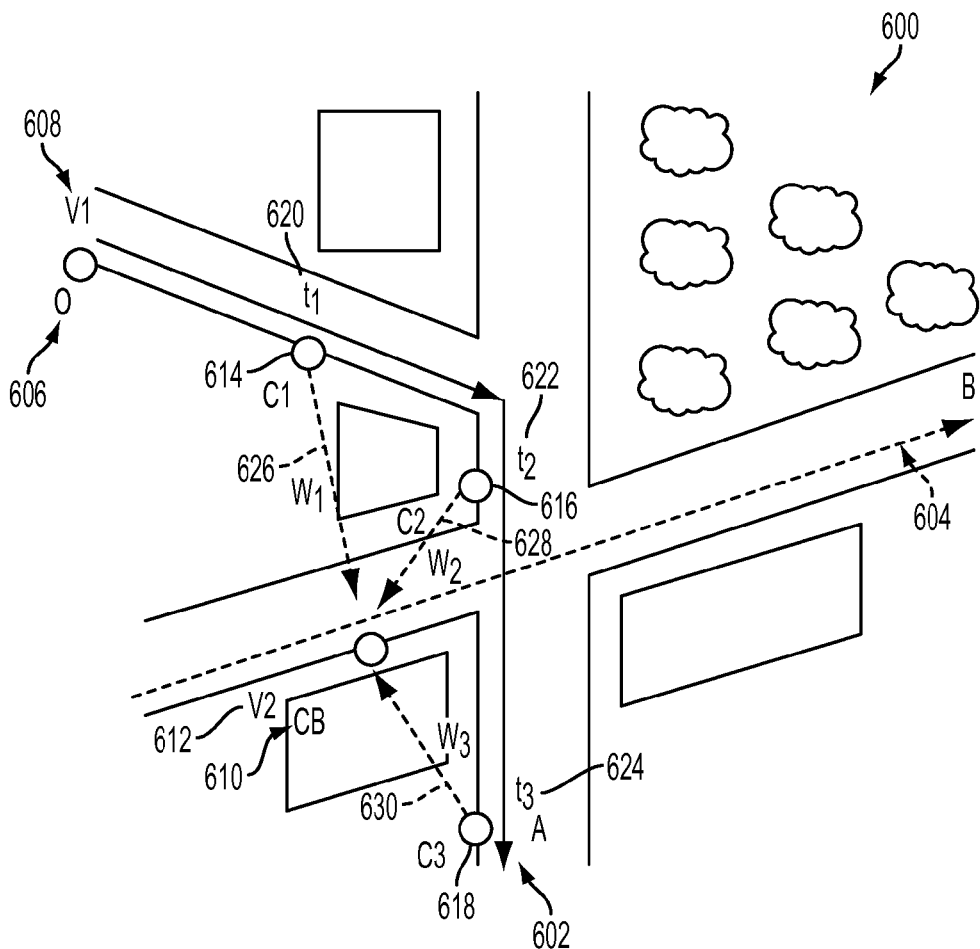
FIG. 6 is a functional diagram which depicts travel on a transportation network.
Figure 7:
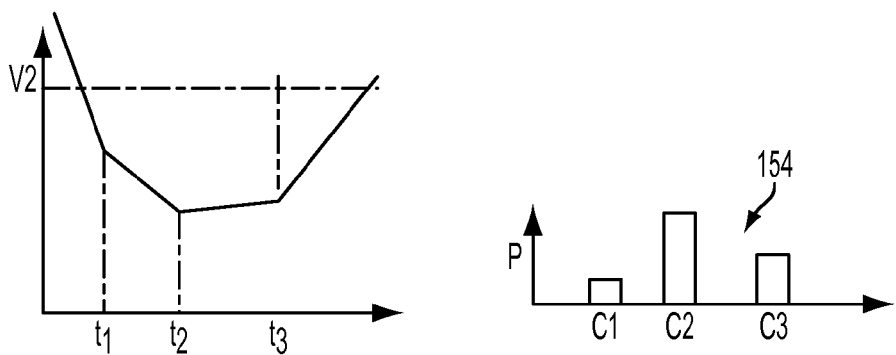
FIG. 7 is a graphical illustration of the travel on the transportation network of FIG. 6.

FIGS. 4A-4B may be better understood in conjunction with the example implementation depicted in FIGS. 6 and 7. FIG. 6 illustrates a simplistic modeling of the inference of an alighting stop 122 of a traveler 192. The traveler 192 boarded route A 602 at stop 606 (i.e., the first origin stop ($o_i$) 170) at time $V_1$ 608 and then boarded line B 604 at stop $C_B$ 610 at time $V_2$ 612. Three alternatives (J=3), i.e., the possible alighting stops 122, are stops $C_1$ 614, $C_2$ 616 and $C_3$ 618. The vehicle 150 passes the stops at time $t_1$ 620, $t_2$ 622, and $t_3$ 624, respectively (the vehicle passage times ($t_j$) 156. The corresponding walking times ($w_j$) 160 to stop $C_B$ 610 are $w_1$ 626, $w_2$ 628 and $w_3$ 630. The following attributes 158 may then be input into Eq. (5) to ascertain the respective probability (P) 154 for each alighting stop $C_1$ 614, $C_2$ 616 and $C_3$ 618 relative to the subsequent origin stop $C_B$ 610 at time $V_2$ 612. Thus, Eq. (5):

$$P(y_{ij} = 1 \mid X, \beta, \sigma) = \frac{1}{D}\sum_{d=1}^{D} \frac{\exp(X_j(\beta + \sigma\mu_i^d))}{\sum_{m=1}^{j} \exp(X_m(\beta + \sigma\mu_i^d))} \quad \text{Eq. (5)}$$

where, the vector $X_j$ may include the attributes 158 describing the choice; below give several attributes 158:
- $x_{j1}$ (walking time attributes 160) given by $w_j$ indicates the time needed to walk from $C_j$ 614-618 to $C_B$ 610;
- $x_{j2}$ (waiting time attributes 162) given by $V_2-t_j-w_j$ indicates the time needed to wait for the vehicle 150 at stop $C_B$ 610 on route B 604 (see FIG. 7, which graphically depicts the waiting times relative to $V_2$ 612);
- $x_{j3}$ (shopping zone attributes 164) which indicates if the possible alighting stop 122 (i.e., stops 614-618) is located in a shopping zone; and $x_{j4}$ (station load attributes 166) which indicates the daily boarding counts 166 for the possible alighting stop 122 (i.e., stops 614-618). It will be appreciated that an assumption may be made that boarding and alighting counts are correlated.

All travelers 192-196 may be split into two groups, traveling during peak and off-peak time, N=2. Utility weights ($\beta_{ik}$) 163 are implemented, and as set forth above, for i=1,2 and k=1,4, and are manually assigned (in this simplified example) in order to reflect the behavior different in the two groups of travelers 192-196. Accordingly, applying these attributes 158 to the probability equation (Eq. (5)) above, indicates the probabilities (P) 154 that stop $C_1$ 614, stop $C_2$ 616, and stop $C_3$ 618 are the destination stop 171, respectively. The most probable alighting stop 122 is selected, i.e., stop $C_2$ 616, as illustrated in FIG. 7.

After determining the destination stop ($d_j$) 171 associated with each origin stop ($o_i$) 170 in the validation information 142 as set forth in FIGS. 1A-1C, or upon a determination at 404 that the validation information 142 does not include entry-only system input, operations proceed to FIGS. 5A-5B. FIGS. 5A-5B begin at 502, whereupon daily validation information 142 is acquired by the validation sequence generator 114. A validation sequence (V=(O,T,D) 176 is then generated by the sequence generator 114 at 504 for a traveler 192-196 from the daily validation information 142.

A set of subsequences ($V_{i:j}$) 178 is then generated by the subsequence generator 116 at 506, each subsequences ($V_{i:j}$) 178 corresponding to a trip 124 from an origin stop ($o_i$) 170 to a destination stop ($d_j$) 171 at a specific time $T(t_i)$. At 508, one of the subsequences ($V_{i:j}$) 178 from the set thereof is retrieved as a trip 124 from an origin stop ($o_i$) 170 to a destination stop ($d_j$) 171 at a time $T(t_i)$. A set of (N) trip plans 124 from the origin stop ($o_i$) 170 and the destination stop ($d_j$) 171 at the time $T(t_i)$ are then retrieved from the trip planning component 118 at 510. The set of (N) trip plans 124 may correspond to a set of most frequently traveled trips 124 from the origin stop ($o_i$) 170 to the destination stop ($d_j$) 171, a set of highest ranked trips 124, or the like.

At 512, a determination is made whether the subsequence ($V_{i:j}$) 178 is in the set of (N) trip plans 124. It may be appreciated that when the subsequence ($V_{i:j}$) 178 corresponds to one of the trip plans 124 in the set of trip plans, then the destination stop ($d_j$) 171 is a valid destination and as such the trip 124 from ($V_{i:j+1}$) would not be a full transfer trip. Upon a determination at 512 that the subsequence ($V_{i:j}$) 178 is not in the set of (N) trips 124, operations proceed to 514. At 514, a subsequence ($V_{i:j+1}$) 178 is generated by the subsequence generator 116 corresponding to a trip 124 from the origin stop ($o_i$) 170 to a subsequent destination ($d_{j+1}$) 171 in the set of destinations D. Operations then return to 510, whereupon the trip planning component 118 generates a set of (N) trip plans 124 from the origin stop ($o_i$) 170 to the destination stop ($d_{j+1}$) 171 at time ($T(t_i)$). Flow then continues thereafter, testing subsequences 178 until a determination is made at 512 that the subsequence ($V_{i:j}$) 178 is present in the set of (N) trip plans 124 output by the trip planning component 118.

After determining that the subsequence ($V_{i:j}$) 178 is present in the set of (N) trip plans 124, the corresponding subsequence ($V_{i:j}$) 178 is identified as a valid trip 124 from the origin stop ($o_i$) 170 to the destination stop ($d_j$) 171 at 516. The origin-destination matrix 100 is then updated at 518 with an entry to reflect the subsequence ($V_{i:j}$) 178 for origin stop ($o_i$) 170 to the destination stop ($d_j$) 171 at time $T(t_i)$, or stated another way ($O_{i:j}$, $T_{i:j}$, $D_{i:j}$), where 1≤i≤j≤n. A determination is then made at 520 whether one or more intermediate destinations ($d_k$) 171 are present in the valid subsequence ($V_{i:j}$) 178. That is, whether there are any destination stops ($d_k$) 171 in the sequence of destinations D of the sequence (V) 176 prior to the destination stop ($d_j$) 171 associated with the valid subsequence ($V_{i:j}$) 178. When there are no intermediate destination stops ($d_k$) 171, operations are made to determine, at 532, whether any other subsequence ($V_{i:j}$) 178 remain in the set generated at 506. When another subsequence ($V_{i:j}$) 178 is present, operations return to 508, wherein the additional subsequence ($V_{i:j}$) 178 is retrieved and processed as set forth above.

Returning to 520, upon a determination that an intermediate destination stop ($d_k$) 171 is present in the subsequence ($V_{i:j}$) 178, the transfer time between the destination stop ($d_k$) 171 and subsequent origin stop ($o_{i+1}$) 170 (the next origin stop in subsequence ($V_{i:j}$) 178) is determined at 522. That is, the time between alighting at the destination stop ($d_k$) 171 (indicated by the schedule information 146, computed per FIGS. 4A-4B, or ascertained via timestamps 168) and boarding at the subsequent origin stop ($o_{i+1}$) 170 (indicated by timestamp 168) is computed. The computed transfer time between the destination stop ($d_k$) 171 and subsequent origin stop ($o_{i+1}$) 170 is then compared to a predetermined threshold time to determine, at 524, whether the transfer time is greater than the predetermined threshold time. That is, the longer the transfer time, the more probable that the traveler 192-196 achieved a separate goal of a multi-goal trip 161, thus indicating the destination stop (d) 171 was intentional and should be added to the origin-destination matrix 100. The threshold time may be set based upon the location in the city at which the alighting and boarding stops are located, e.g., greater amounts of time for restaurant areas, schools, government buildings, etc. The threshold time may be thirty-minutes, one hour, or any other desired time limit.

In the event that the transfer time is greater than or equal to the threshold time, the origin destination matrix 100 is updated with entries to reflect the two intermediate trips 124 $V_{i:k}$ from $o_i$ to $d_k$ and $V_{k+1:j}$ from $o_{k+1}$ to $d_j$, e.g., OD($o_i$, $d_k$, $T(t_i)$) and OD($o_{k+1}$, $d_j$, $T(t_{k+1})$) at 526. A determination is then made at 528 whether any additional intermediate trips 124 are present in the valid transfer trip 124 (subsequence ($V_{i:j}$) 178), i.e., whether another destination stop ($d_{k+1}$) 171 is present in the subsequence ($V_{i:j}$) 178. Upon a positive determination, operation returns to 522 for a determination as to the transfer time between this destination stop ($d_{k+1}$) 171 and the next origin stop 170 (e.g., $o_{k+2}$), and so forth.

Upon a determination at 528 that no other intermediate destination stops ($d_k$) 171 are present in the valid subsequence ($V_{i:j}$) 178, each intermediate trip 124 in the origin-destination matrix 100 is weighted at 530. As the presence of the intermediate destination stop ($d_k$) 171 in a valid transfer trip 124, i.e. subsequence ($V_{i:j}$) 178, is indicative of a multi-goal trip 161 on the transportation system 140, each goal of the trip 161 should be properly accounted in the origin-destination matrix 100. This accounting may be established by weighting the corresponding entries in the matrix 100. Weighting of entries in the origin-destination matrix 161 reflecting the multi-goal trips 161 (i.e., different destinations) may be accomplished using a suitable weighting schema 157 or actual knowledge of the traveler's intent, as selected by the weight determination component 120.

For example, the weight determination component 120 may select application of an equal weighting schema, such that a trip 124 is assigned to each goal and weighted equally. For a two-goal transfer trip from stop A 180 to stop B 182 with a stop at stop C 184, the origin-destination matrix 100 accounts for trip A-to-B (trip B 204) with weight 0.5. Two trips A-to-C and C-to-B get weighted at 0.25 each. Another example is an importance weighting schema, wherein a goal (e.g., a destination) is linearly weighted to its trip frequency. Two goals with frequencies $f_1$ and $f_2$ will have weights $f_1/(f_1+f_2)$ and $f_2/(f_1+f_2)$, accordingly. A third example is an inverted importance weighting schema, wherein two goals with corresponding trip frequencies $f_1$ and $f_2$ will be weighted as $f_2/(f_1+f_2)$ and $f_1/(f_1+f_2)$.

After weighting at 530, a determination is made at 532 whether another subsequence ($V_{i,j}$) 178 in the set of subsequences associated with the validation sequence 176 remains for analysis. Upon a positive determination at 532, operations return to 508, whereupon the next subsequence ($V_{i+1:x}$) 178 is retrieved and subjected to 510-130 as set forth above. When it is determined that no additional subsequence ($V_{i,j}$) 178 remain in the daily validation sequence 176 of a traveler 192-196 at 532, flow proceeds to 534. At 534, a determination is made whether another traveler 192-196 having validation information 142 remains for processing. Upon a positive determination at 534, operations return to 504, whereupon the validation sequence generator 114 generates a daily validation sequence 176 for the remaining traveler 192-196. Upon a determination that no additional travelers 192-196 are present, the origin-destination matrix 100 dynamically generated for the transportation system 140 in accordance with FIGS. 5A-5B is output. 502-536 may be better understood in conjunction with ALGORITHM 1, which illustrates the generation of a dynamic origin-destination matrix 100 for a transportation system 140. ALGORITHM 1 generates the dynamic origin-destination matrix 100 from all origin stops (o) 170, destination stops (d) 171, and time segments $t_1, \ldots, t_m$. It will be appreciated that ALGORITHM 1 further employs the trip planning component 118, which may be queried with an (o,d,t) triple in order to retrieve the set of (N) trips 124 from the origin stop ($o_i$) 170 to the destination stop ($d_j$) 171 at time t. For timestamp $t_i$, $T(t_i)$ denotes the time segment for which the trip should be accounted.

---

Algorithm 1 Extract the dynamic OD matrix from ATV data

---

Input: Daily transaction sequences V = (O, T , D) for all passengers
Input: Planner P
Output: Dynamic OD matrix from origins o to destinations d, at time segments t
1: for each transaction sequence V = (O, D, T) do
2:  OD(o, d, t) = 0 for all o, d and t initialize OD matrix
3:  i := 1; start point
4:  j := 0;
5:  while j ≤ n do
6:   j := j + 1
7:   if $V_{i,j}$ is a valid transfer trip from $o_i$ to $d_j$ then
8:    Update OD($o_i$, $d_j$, T ($t_i$))
9:    if $d_k$ is an intermediate goal of $V_{i,j}$, i ≤ k ≤ j then
10:     Update OD($o_i$, $d_k$, T ($t_i$)) and OD($o_{k+1}$, $d_j$, T ($t_{k+1}$))
11:    end if
12:    i := j + 1 new start point
13:   end if
14:  end while
15: end for
16: Return dynamic matrix OD (o, d, t)

---

As discussed above, the output from ALGORITHM 1, the dynamic origin-destination matrix 100 may be updated with weighting schema 157 to reflect the multi-goal trips 161, such as one of the schema 157 referenced at 530. The matrix 100 may then be used to monitor and predict demand on the transportation system 140, enabling planners and administrators to make changes to routes 144, schedules 146, plan additional stops, or the like.

A suitable example of an origin-destination matrix 100 may be illustrated as:

| ORIGIN | DESTINATION | | | | |
|---|---|---|---|---|---|
|  | 1 | 2 | 3 | 4 | Z |
| 1 | $V_{1:1}$ | $V_{1:2}$ | $V_{1:3}$ | $V_{1:4}$ | $V_{1:z}$ |
| 2 | $V_{2:1}$ |  |  |  |  |
| 3 | $V_{3:1}$ |  |  |  |  |
| 4 | $V_{4:1}$ |  |  |  |  |
| Z | $V_{z:1}$ |  |  |  | $V_{z:z}$ |
|  | $T(t_i)$ |  |  |  |  |

The matrix 100 presented above corresponds to a general origin-destination matrix representing origin stops 170, destination stops 171, and the number of trips ($V_{z:z}$) between a corresponding origin stop 170 and destination stop 171 at the time segment ($T(t_i)$). Thus, each multi-goal trip 161 identified in FIGS. 5A-5B above will be suitably input into the matrix 100 as a trip 124 between the origin stop ($o_i$) 170 and the destination stop ($d_k$) and the origin stop ($o_{k+1}$) and corresponding destination stop ($d_j$) 171. Thus, when a subsequence 178 is identified as is identified as a trip from origin stop 1 to destination stop (4), an entry will be added to the trips for the subsequence $V_{1:4}$. When a multi-goal trip 161 is detected (FIGS. 5A-5B) in the subsequence $V_{1:4}$, i.e., and intermediate stop at destination stop (2) 171, and the user includes another boarding stop (3) 170, the multi-goal trips 161 corresponding to $V_{1:2}$ and $V_{3:4}$ will be weighted and incorporated into the matrix 100.

It will be appreciated that when the origin-destination matrix 100 is generated based upon limited validation information 142, i.e., not all travelers 192-196 are accounted for, the matrix 100 may be suitably scaled up to the appropriate traveler flow on the transportation system 140, or the values $V_{z:z}$ may be normalized to represent the a percentage or ratio of the total number of trips represented by the matrix.

EXAMPLES

Figure 8:
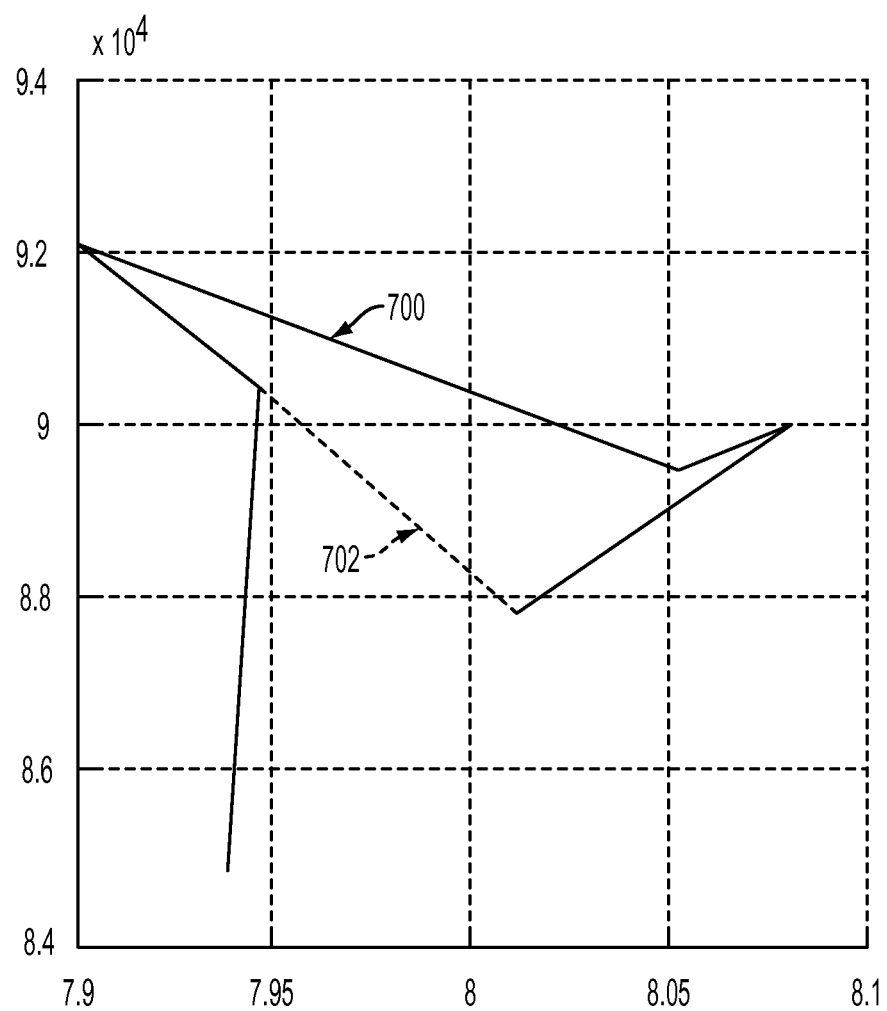
FIGS. 8-10 are graphical illustrations of validation information collected for a traveler.
Figure 9:
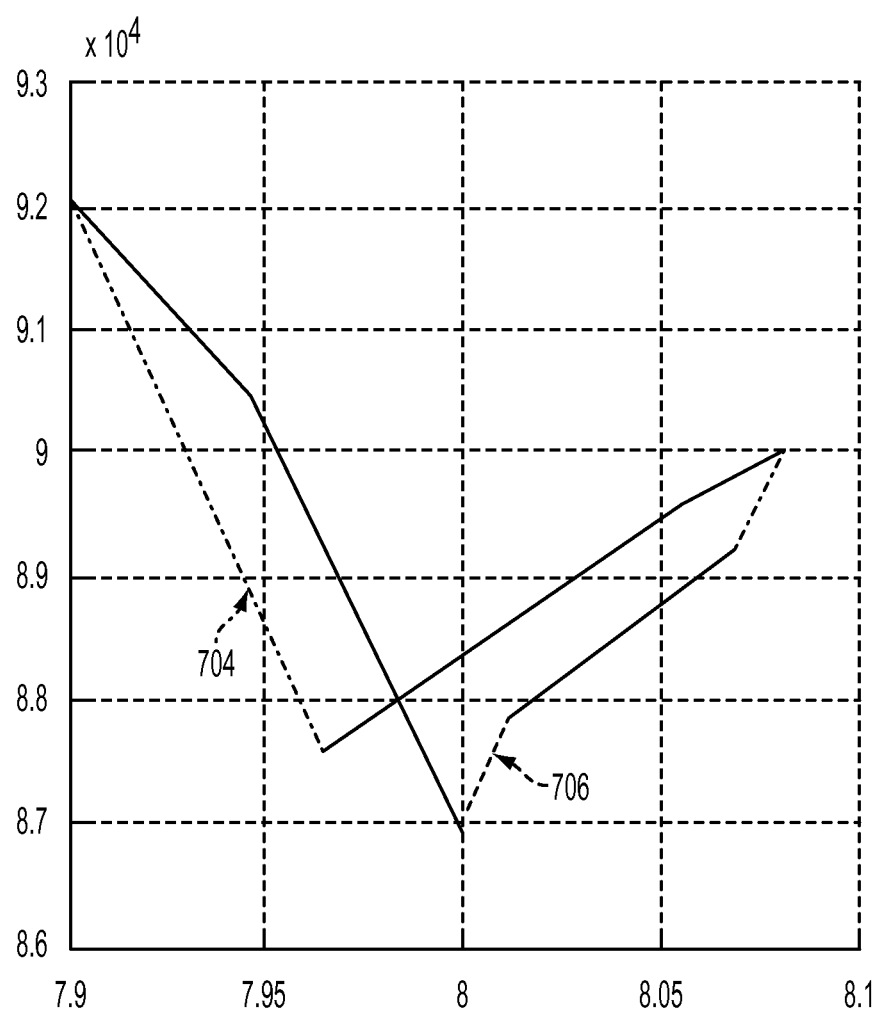
Figure 10:
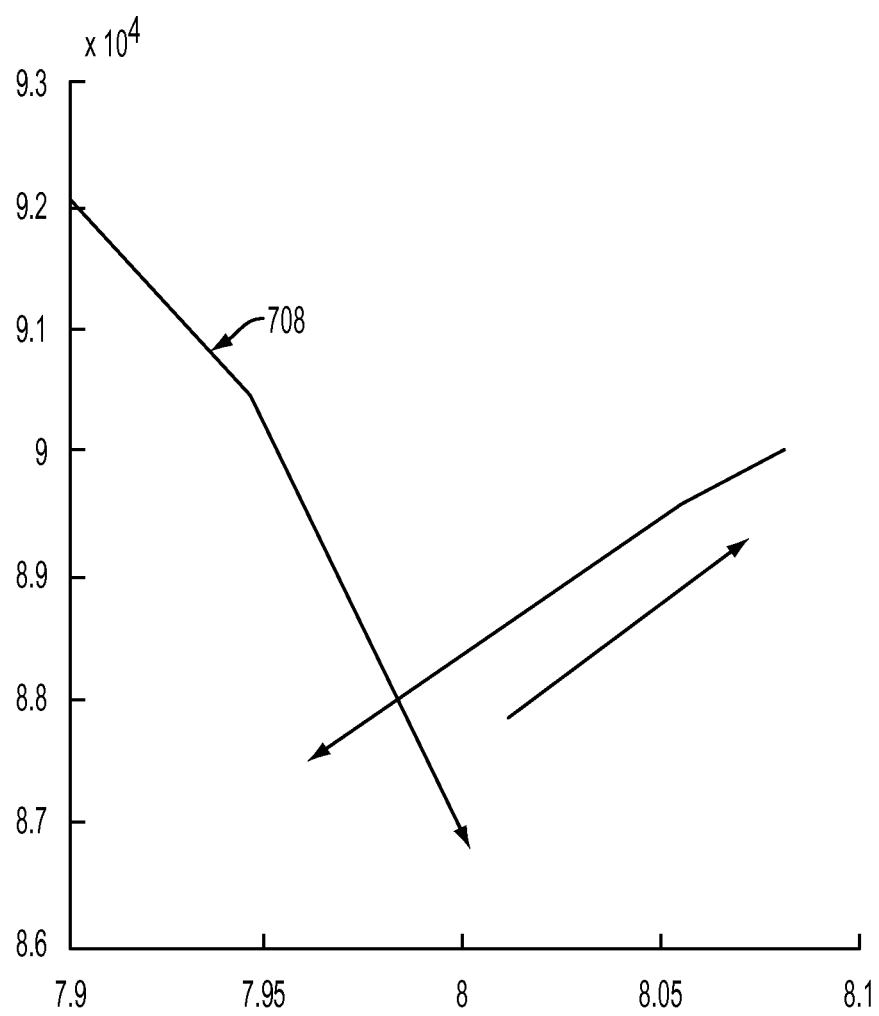
Figure 11:
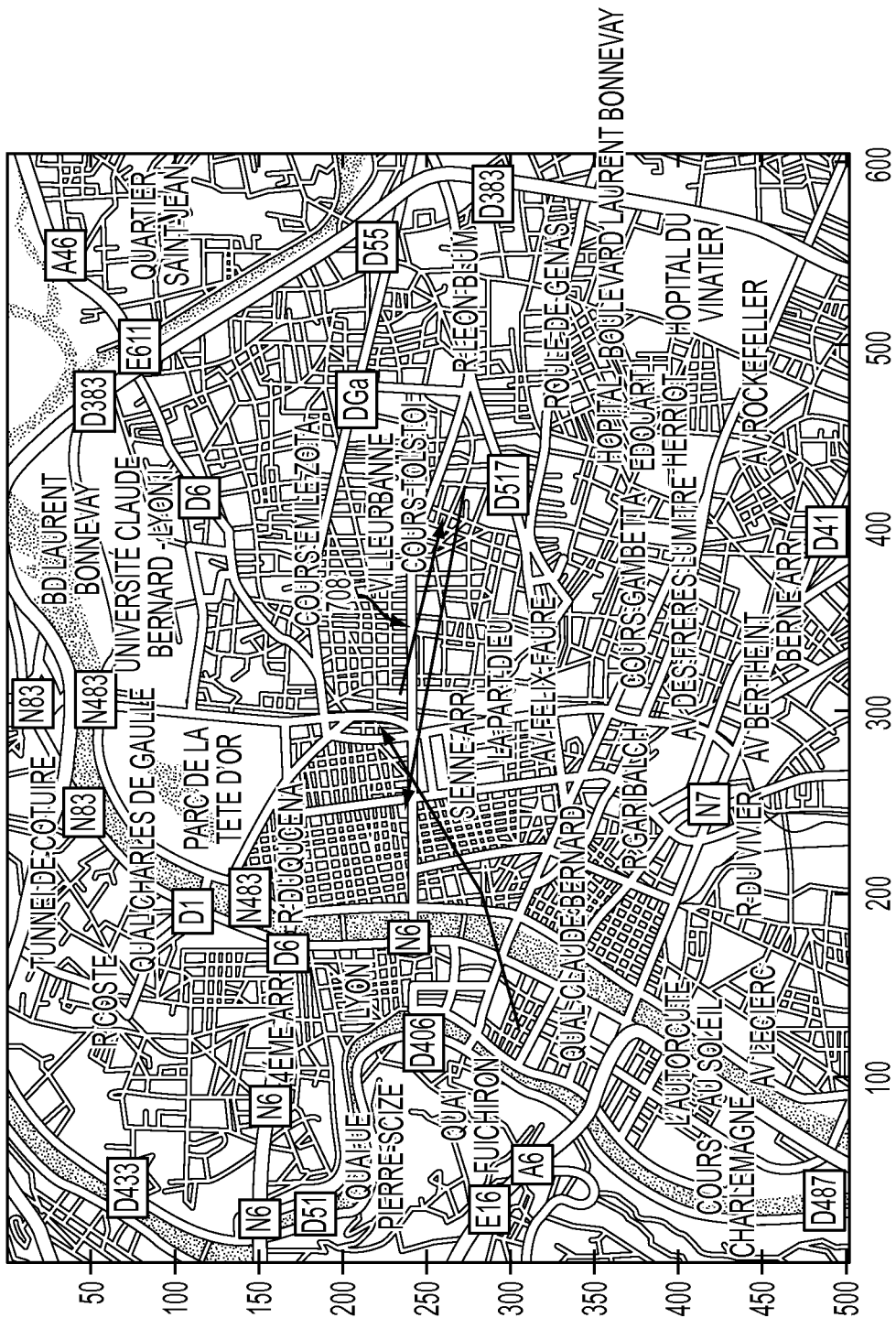
FIG. 11 is a graphical mapping of the trips of the traveler of FIGS. 8-10.

FIGS. 8-10 illustrate an example of a daily validation sequence 176 of a traveler 192-196. FIG. 8 each segment in blue 700 connects two sequential boarding stops, the red segment 702 connects the last boarding to the next day's first boarding. FIG. 9 completes the graph with the inferred alightings, with blue segments 700 connecting boardings to the corresponding alightings; the green segments 704 correspond to 3 walks and missing trip; magenta links 706 shows the last walk. FIG. 10 illustrates the valid transfer trips 708 extracted by ALGORITHM 1. FIG. 11 projects the valid transfer trips 708 onto a corresponding city map.

Figure 12:
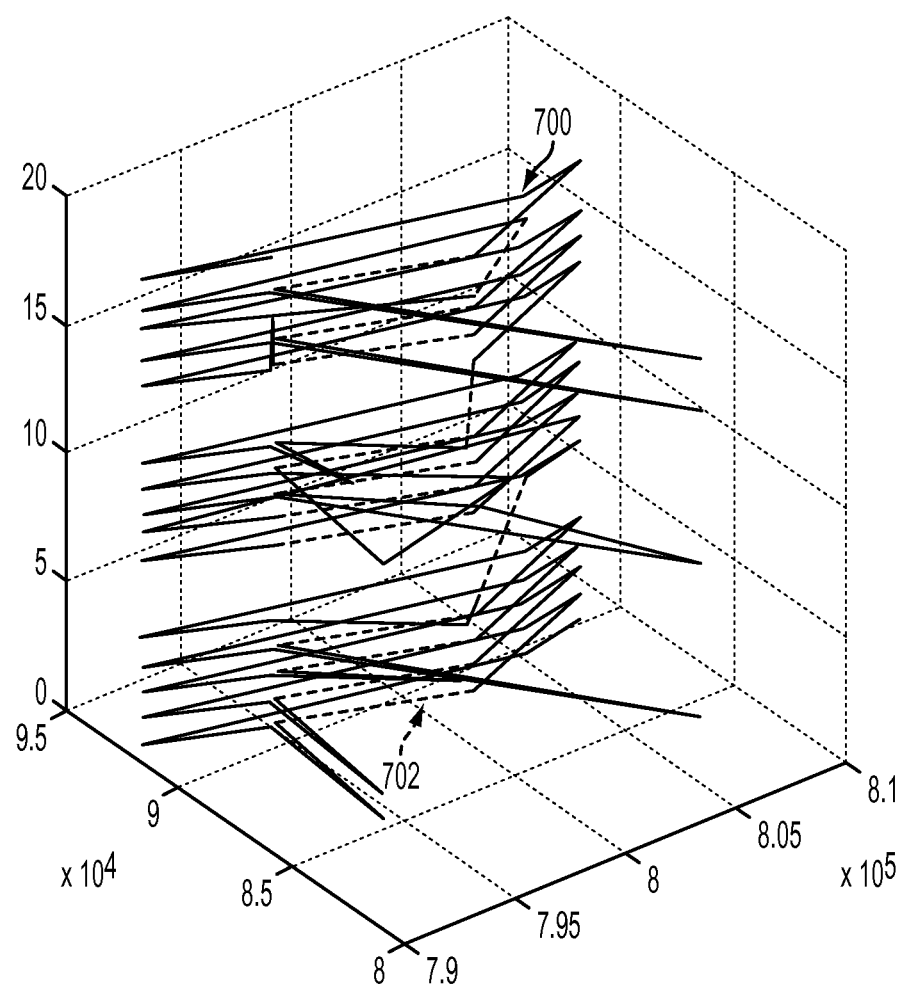
FIGS. 12-14 are graphical illustrations of validation information collected for the traveler of FIGS. 8-10 over an extended period of time.
Figure 13:
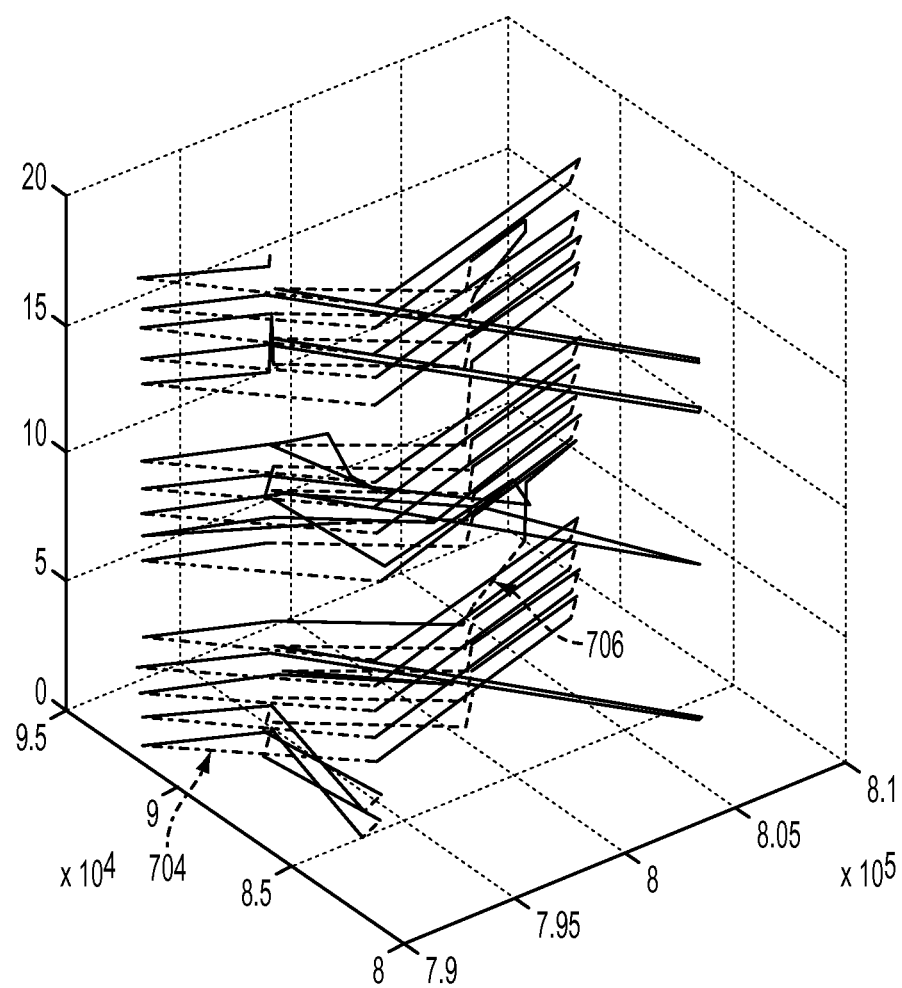
Figure 14:
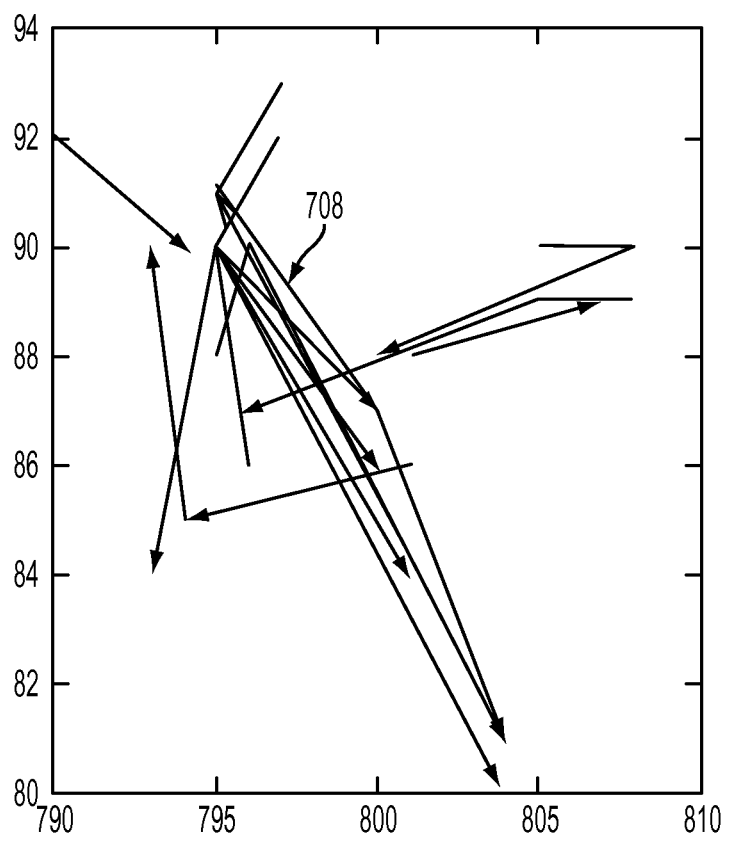

FIGS. 12-14 show the same processing steps for the validation information 142 for the same traveler 192-196 (as set forth in FIGS. 8-10) over a time period of three weeks. FIG. 12 shows all collected validation information 142 in 3-dimensional X-Y-T space, where line segments 700 connect sequential boardings and dashed lines 702 make overnight connections. FIG. 13 adds to the 3-dimensional view the inferred alightings as described above with respect to FIG. 9. FIG. 14 shows all valid transfer trips 708 extracted for the given traveler 192-196.

It will be appreciated that the methods set forth above with respect to FIGS. 3-7 provide for the identification of multi-goal trips 161, while avoiding the inclusion of non-multi-goal trips. For example, multi-goal trips 161 are distinguished from single goal trips by taking into account the minimal transfer times associated with single goal trips. Multi-goal trips 161 are also distinguished from multiple transfers with multiple goal trips. For example, accompanying a child to school and then boarding the same bus in the opposite direction is not a multi-goal trip as set forth above. Rather, the full transfer trip (from the origin to the final destination) should be reasonable enough if the intermediate stops would be ignored, hence the use of the trip planning component 118 for comparisons. Thus, the embodiments discussed above identify multi-goal transfer trips 161 from validation information 142 wherein the traveler 192-196 boards, alights and then boards again on the same route in the same direction. As discussed above, and presented in FIG. 6, multi-goal trips 161 may be observed even when more than one route are taken by a traveler 192-196. These planned transit stops are generally in areas of the city associated with the transportation system 140 corresponding to sporting venues, shopping malls, restaurants, and the like.

The method illustrated in FIGS. 3-5B may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 3-5, can be used to implement the method estimating origins and destinations for users of a transportation system.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for generating an origin-destination matrix for a transportation system, the method performed by at least one processor in communication with at least one memory, wherein the at least one processor is configured to perform operations including:

initializing, for an entry-only validating transportation system, an origin-destination matrix with a set of origin stops and a set of destination stops;
   acquiring, in real-time, via a plurality of automated ticket validation systems of the transportation system, validation sequences for each traveler of a set of travelers on the transportation system, each validation sequence including a plurality of the origin stops, a timestamp associated with each of the plurality of the origin stops, and a ticket identification associated with the validation sequence used at each of the plurality of the origin stops, wherein the ticket identification is distinct for each traveler, wherein the automated ticket validation systems comprise a ticket reading device to acquire validation information to generate the validation sequences;
   for each origin stop:
      selecting, from the set of destination stops, a set of possible alighting stops associated with the origin stop,
      computing a probability for each of the possible alighting stops being a destination stop for the origin stop, and
      selecting a most probable alighting stop as a respective destination stop from the set of possible alighting stops;
   for each of the validation sequences, generating a set of subsequences, each subsequence including a respective one of the plurality of the origin stops and the associated timestamp;
   based on the set of subsequences, identifying subsequences which in combination constitute a valid transfer trip for at least one traveler of the set of travelers;
   for a combination of subsequences constituting the valid transfer trip, determining whether the valid transfer trip is a multi-goal trip for the at least one traveler of the set of travelers for which there is at least a first destination stop with an intermediate goal and a second destination stop with a final goal;
   updating the origin-destination matrix based on the determination;
   refining at least one route of the transportation system in accordance with the updated origin-destination matrix; and
   modifying the transportation system using the updated origin-destination matrix, wherein the modification of the transportation system includes a plurality of: adding or removing a vehicle from the at least one route, adding or subtracting the at least one route, changing a path of the at least one route, adding or removing a station along the at least one route, and adding or subtracting a stop along the at least one route.

2. The method of claim of claim 1, wherein the identifying subsequences which in combination constitute the valid transfer trip comprises:
   accessing a set of trip plans from an origin stop for a first of the subsequences to a destination stop for a subsequent one of the subsequences for a time segment which includes the associated timestamp of the origin stop for the first of the subsequences;
   where the set of trip plans includes the first and subsequent subsequences, identifying the combination of subsequences as the valid transfer trip.

3. The method of claim of claim 1, wherein the determining comprises:
   computing a transfer time between the first destination stop and a subsequent origin stop;

comparing the computed transfer time to a predetermined threshold time; and wherein the determination is based on the comparison.

4. The method of claim 1, wherein the updating of the origin-destination matrix comprises:

for an identified valid transfer trip, updating the origin-destination matrix to reflect a single origin-destination trip which incorporates the subsequences of the valid transfer trip.

5. The method of claim 1, wherein the updating of the origin-destination matrix comprises:

for the multi-goal trip, updating the origin-destination matrix to reflect a plurality of origin-destination trips for the multi-goal trip.

6. The method of claim 1, wherein the updating of the origin-destination matrix comprises:

providing a weighting schema for weighting each of a predefined set of goals of multi-goal trips; and associating an intermediate destination with one of the goals; and updating the origin-destination matrix in accordance with the weighting schema and the one of the goals.

7. The method of claim 6, wherein the weighting schema is one of an equal weighting schema, an importance weighting schema, and an inverted importance weighting schema.

8. The method of claim 1, wherein the acquiring of the validation sequences further comprises:

collecting validation information for at least some of the travelers in the set of travelers on the transportation system, the validation information including a first set of origin stops and corresponding timestamps; and determining an inferred destination stop for each of the first set of origin stops in accordance with a subsequent origin stop.

9. The method of claim 8, wherein the least one processer is further configured to perform:

retrieving route information and schedule information corresponding to a vehicle boarded by a traveler at a first origin stop;

identifying a set of stops on a route of the first origin stop in relative proximity to the subsequent origin stop; and selecting the set of possible alighting stops from the set of stops in relative proximity to the subsequent origin stop.

10. The method of claim 9, wherein computing the probability further comprises:

determining a vehicle passage time of the vehicle boarded at the origin stop relative to an identified stop in the set of possible alighting stops on the route in relative proximity to the subsequent origin stop;

determining a walking time from each stop in the set of possible alighting stops to the subsequent origin stop;

computing a wait time at the subsequent origin stop in accordance with the timestamp associated with the subsequent origin stop, the vehicle passage time, and the schedule information;

assigning a zone attribute to each of the possible alighting stops in the set thereof;

determining a station load associated with each stop in the set of possible alighting stops; and computing the probability for each of the possible alighting stops in accordance with at least one of the vehicle passage time, the determined walking time, the computed wait time, the zone attribute, and the determined station load.

11. The method of claim 10, further comprising assigning a utility weight to each of the possible alighting stops prior to computing the probability thereof.

12. The method of claim 11, wherein computing the probability is performed in accordance with a discrete choice model.

13. A dynamic origin-destination matrix generation system, comprising at least one processor in communication with at least one memory, wherein the at least one processor is configured to:

generate an origin-destination matrix;

define each of a plurality of validation sequences based on validation information in real-time for at least some of a plurality of travelers on an entry-only transportation system, at least some of the validation sequences including a set of origin stops, a set of destination stops, associated timestamps corresponding thereto, and a ticket identification associated with the validation sequence used at each of the set of origin stops, wherein the ticket identification is distinct for each traveler, wherein the validation information is acquired by an automatic ticketing validation system configured to detect at least an origin stop of a traveler in the plurality of travelers;

generate a set of subsequences for each of the validation sequences, each subsequence including the origin stop, at least one destination stop, and a time segment corresponding to a boarding at the origin stop of for the traveler in the plurality of travelers;

determine a set of trip plans for at the traveler in the plurality of travelers from the origin stop to the at least one destination stop at the time segment;

select a set of possible alighting stops associated with the origin stop in accordance with a subsequent origin stop, compute a probability for each of the possible alighting stops being the at least one destination stop of the origin stop, and select a most probable alighting stop as the at least one destination stop from the set of possible alighting stops;

identify at least one subsequence in the set thereof as a valid transfer trip in accordance with the at least one subsequence in the set of trip plans, identify at least one multi-goal trip in the identified at least one subsequence in accordance with an intermediate destination stop in the at least one subsequence, update the origin-destination matrix in accordance with each of the identified subsequences and multi-goal trips, and modify the transportation system using the updated origin-destination matrix, the transportation system comprising:

a plurality of routes, each route having a path about a geographic area;

at least one vehicle associated with each route;

at least one stop along each route; and at least one station;

wherein the modification of the transportation system includes at least one of: adding or removing a vehicle from at least one route, adding or subtracting the at least one route, changing the path of the at least one route, adding or removing a station along the at least one route, and adding or removing a stop along the at least one route.

14. The system of claim 13, wherein at least one processor is further configured to:

compute a transfer time between the intermediate destination stop and the subsequent origin stop;

compare the computed transfer time to a predetermined threshold time; and identify a trip from the origin stop to the intermediate destination stop as a goal of a multi-goal trip in response to an output of the comparison indicating the computed transfer time is greater than the predetermined threshold time.

15. The system of claim 13, wherein the at least one processor is further configured to:

select a weighting schema for each goal of the multi-goal trip; and weight each goal in the origin-destination matrix in accordance with the selected weighting schema, and wherein the weighting schema is an equal weighting schema, an importance weighting schema, or an inverted importance weighting schema.

16. The system of claim 15, wherein the at least one processor is further configured to:

retrieve route information and schedule information from an associated database corresponding to a vehicle boarded by the traveler at the origin stop;

identify a set of stops on the route of the origin stop in relative proximity to the subsequent origin stop; and output the selected set of possible alighting stops from the set of stops in relative proximity to the subsequent origin stop to a destination probability generator.

17. The system of claim 15, wherein the at least one processor is further configured to:

determine a vehicle passage time of the vehicle boarded at the origin stop relative to an identified stop in the set of possible alighting stops on the route in relative proximity to the subsequent origin stop;

determine a walking time from each stop in the set of possible alighting stops to the subsequent origin stop;

compute a wait time at the subsequent origin stop in accordance with the timestamp associated with the subsequent origin stop, the vehicle passage time, and the schedule information;

assign a zone attribute to each of the possible alighting stops in the set thereof;

determine a station load associated with each stop in the set of possible alighting stops; and compute the probability for each of the possible alighting stops in accordance with at least one of the vehicle passage time, the determined walking time, the computed wait time, the zone attribute, and the determined station load.

18. A computer-implemented method for dynamically generating an origin-destination matrix of an entry-only transportation system, comprising:

generating an origin-destination matrix, the origin-destination matrix including information about a spatial and a temporal distribution of activities between different traffic zones in the transportation system;

acquiring validation information for a set of travelers of the transportation system in real-time, the validation information for at least some of the travelers in the set including a set of origin stops, a timestamp for each origin stop, and a ticket identification associated with a validation sequence used at each origin stop, wherein the ticket identification is distinct for each traveler, but lacking a corresponding destination stop for at least one origin stop of the set of origin stops, wherein the validation information is acquired by an automatic ticketing validation system configured to detect at least an origin stop of a traveler in the set of travelers;

selecting, with a processor, a set of possible alighting stops for each of the origin stops in the validation information lacking the corresponding destination stop, the set of possible alighting stops selected in accordance with at least one of a proximity to a subsequent origin stop, a route associated with the origin stop, and a schedule associated with a vehicle boarded at the origin stop;

computing a probability for each stop in the set of possible alighting stops relative to the origin stop corresponding to the probability that each alighting stop is a destination stop of the origin stop;

selecting a possible alighting stop from the set thereof as the destination stop of the origin stop in accordance with the computed probability associated therewith for each origin stop of the set of origin stops;

generating validation sequences for the at least some of the travelers in the set of travelers in accordance with the acquired validation information and the selected possible alighting stop for each origin stop of the set of origin stops;

segmenting each validation sequence into a set of subsequences, each subsequence including a first origin stop, at least one inferred destination stop, and a time segment associated with the timestamp corresponding to the origin stop;

receiving a set of trip plans for at least one traveler of the set of travelers from the first origin stop to the at least one inferred destination stop at the time segment for each subsequence;

identifying at least one subsequence in the set thereof as a valid transfer trip for the at least one traveler of the set of travelers in accordance with the at least one subsequence in the set of trip plans;

identifying at least one multi-goal trip for the at least one traveler of the set of travelers in the identified at least one subsequence in accordance with an intermediate destination stop in the at least one subsequence;

updating the origin-destination matrix in accordance with each of the identified subsequences and multi-goal trips; and modifying the transportation system using the updated origin-destination matrix, the modifying representative of adding or removing a vehicle, a route, a station or a number of stops to or from the transportation system.

19. The computer-implemented method of claim 18, wherein identifying at least one multi-goal trip further comprises:

computing a transfer time between the intermediate destination stop and a subsequent origin stop;

comparing the computed transfer time to a predetermined threshold time; and identifying a trip from the origin stop to the intermediate destination stop as a goal of the multi-goal trip in response to an output of the comparison indicating the computed transfer time is greater than the predetermined threshold time.

20. The computer-implemented method of claim 19, wherein updating the origin-destination matrix further comprises:

selecting a weighting schema for each goal of the multi-goal trip; and weighting each goal in the origin-destination matrix in accordance with the selected weighting schema.

21. The computer-implemented method of claim 20, wherein computing a probability for each of the set of possible alighting stops further comprises:

determining a vehicle passage time of the vehicle boarded at the origin stop relative to an identified stop in the set of possible alighting stops on the route in relative proximity to the subsequent origin stop;

determining a walking time from each stop of the set of possible alighting stops to the subsequent origin stop;

computing a wait time at the subsequent origin stop in accordance with the timestamp associated with the subsequent origin stop, the vehicle passage time, and the schedule information;

assigning a zone attribute to each of the possible alighting stops in the set thereof;

determining a station load associated with each stop in the set of possible alighting stops; and computing the probability for each of the possible alighting stops in accordance with at least one of the vehicle passage time, the determined walking time, the computed wait time, the zone attribute, and the determined station load.

* * * * *